(12) United States Patent
Blair et al.

(10) Patent No.: US 9,284,976 B2
(45) Date of Patent: Mar. 15, 2016

(54) COUNTERSHAFT

(71) Applicant: Waukesha Bearings Corporation, Pewaukee, WI (US)

(72) Inventors: Barry Blair, Oconomowoc, WI (US); James L. Otto, Rhinelander, WI (US); Mike Gwizdek, West Allis, WI (US)

(73) Assignee: Waukesha Bearings Corporation, Pewaukee, WI (US)

( * ) Notice: Subject to any disclaimer, the term of this patent is extended or adjusted under 35 U.S.C. 154(b) by 49 days.

(21) Appl. No.: 14/203,562

(22) Filed: Mar. 11, 2014

(65) Prior Publication Data

US 2014/0254963 A1 Sep. 11, 2014

Related U.S. Application Data

(63) Continuation-in-part of application No. 14/203,556, filed on Mar. 10, 2014.

(60) Provisional application No. 61/775,584, filed on Mar. 9, 2013, provisional application No. 61/775,572, filed on Mar. 9, 2013.

(51) Int. Cl.
    *F16C 17/02* (2006.01)
    *F16C 32/06* (2006.01)
    *F16C 33/10* (2006.01)

(52) U.S. Cl.
    CPC ............... *F16C 17/028* (2013.01); *F16C 17/02* (2013.01); *F16C 32/0659* (2013.01); *F16C 32/0685* (2013.01); *F16C 33/107* (2013.01); *F16C 33/1055* (2013.01)

(58) Field of Classification Search
    CPC ............... F16C 17/028; F16C 32/0659; F16C 32/0655; F16C 33/101; F16C 33/1015; F16C 33/1055; F16C 33/1075
    See application file for complete search history.

(56) References Cited

U.S. PATENT DOCUMENTS

| 4,325,589 | A  | * | 4/1982  | Hirt .............................. 384/375 |
| 4,558,960 | A  | * | 12/1985 | Lehtinen et al. .............. 384/373 |
| 5,279,497 | A  | * | 1/1994  | Sjodin ........................... 384/373 |
| 5,567,056 | A  | * | 10/1996 | Blase et al. ................... 384/286 |
| 6,017,184 | A  |   | 1/2000  | Aguilar et al. |
| 8,366,323 | B2 |   | 2/2013  | Waki et al. |
| 2011/0200422 | A1 |   | 8/2011  | Gutknecht |

FOREIGN PATENT DOCUMENTS

JP 06-173954 * 6/1994

* cited by examiner

*Primary Examiner* — Thomas R. Hannon
(74) *Attorney, Agent, or Firm* — Hamilton IP Law; Jay R. Hamilton; Charles A. Damschen

(57) ABSTRACT

A countershaft as disclosed herein may include one or more bearing zones along its axial length. Each bearing zone may include one or more radial holes in fluid communication with one or more grooves, respectively, and one or more axial channels formed along the longitudinal length of the countershaft. Each groove may be positioned adjacent an interface between a rotating member and a non-rotating member and include one or more features therein, such as a profile and/or taper.

16 Claims, 23 Drawing Sheets

COUNTERSHAFT

CROSS REFERENCE TO RELATED APPLICATIONS

This patent application claims priority from provisional U.S. Pat. App. Nos. 61/775,584 and 61/775,572 both filed on Mar. 9, 2013, and this patent application also claims priority from and is a continuation-in-part of U.S. patent application Ser. No. 14/203,556 filed on Mar. 10, 2014, which applications are incorporated by reference herein in their entireties.

FIELD OF INVENTION

The present invention relates to interfaces between a rotatable and non-rotatable member.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BACKGROUND

Journal bearings may have one or more inlets and/or grooves/features in the bore. Generally, the configuration and number of features affect both the static and dynamic performance of the bearing. Compared to a standard cylindrical bore bearing, profiled journal bearings, examples of which include but are not limited to elliptical, multi-lobe taper land, and offset bore bearings may be more stable due to lobes/features in the bore of the bearing. However, because such a bearing is a fixed profile bearing, its performance (e.g., film thickness, maximum bearing temperature, and stability) is typically optimized for one or just a few loading conditions. Accordingly, when the load changes (e.g., direction, magnitude, etc.) it is common for the bearing performance to degrade. Furthermore, a profiled journal bearing may also exhibit instabilities like a standard cylindrical bore bearing under certain operating conditions.

Examples of journal bearings are shown in U.S. Pat. Nos. 6,966,700; 6,547,438; 5,480,234 and 4,097,094 and U.S. patent application Ser. No. 12/708,439, all of which are incorporated by reference herein in their entireties.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

DETAILED DESCRIPTION

Listing of Elements

Figure 1:
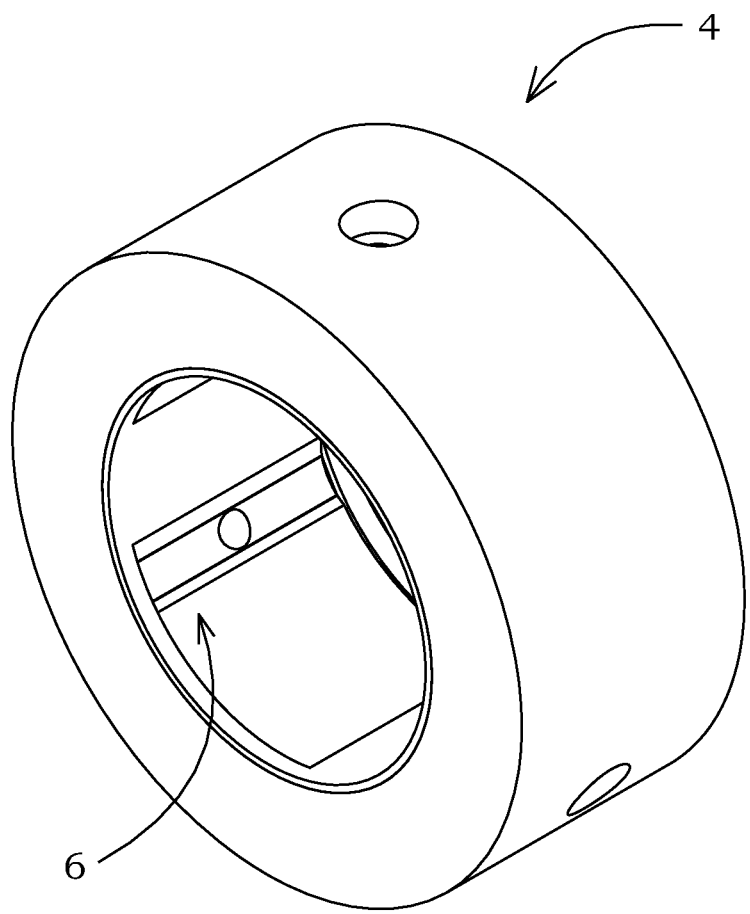
FIG. 1 provides a perspective view of a multi-lobe taper land bore bearing as found in the prior art.

| ELEMENT DESCRIPTION | ELEMENT # |
|---|---|
| Prior art bearing | 4 |
| Lobe | 6 |
| Shaft | 8 |
| Bearing with axial variations | 10 |
| Bore | 12 |
| Axial channel | 14 |
| Notch | 15 |
| Bearing surface | 16 |
| Spacer | 17 |
| Main body | 18 |
| First zone | 20 |
| Radial hole | 22 |
| Groove | 24 |
| Taper | 26 |
| Second zone | 30 |
| Radial hole | 32 |
| Groove | 34 |
| Taper | 36 |
| Third zone | 40 |
| Radial hole | 42 |
| Groove | 44 |
| Taper | 46 |
| Countershaft | 100 |
| Spacer | 112 |
| Axial channel | 114 |
| Land | 116 |
| First bearing zone | 120 |
| Radial hole | 122 |
| Groove | 124 |
| Taper | 126 |
| Second bearing zone | 130 |
| Radial hole | 132 |
| Groove | 134 |
| Taper | 136 |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

Referring now to the drawings, wherein like reference numerals designate identical or corresponding parts throughout the several views, FIG. 1 provides an axial view of a prior art bearing 4 having three lobes 6, consisting of the bearing surface between oil feed grooves or holes, equally spaced about the bore 12 formed in the main body 18 of the prior art bearing 4.

Such a design may be plagued by various problems, including but not limited to those described in detail above.

Figure 2A:
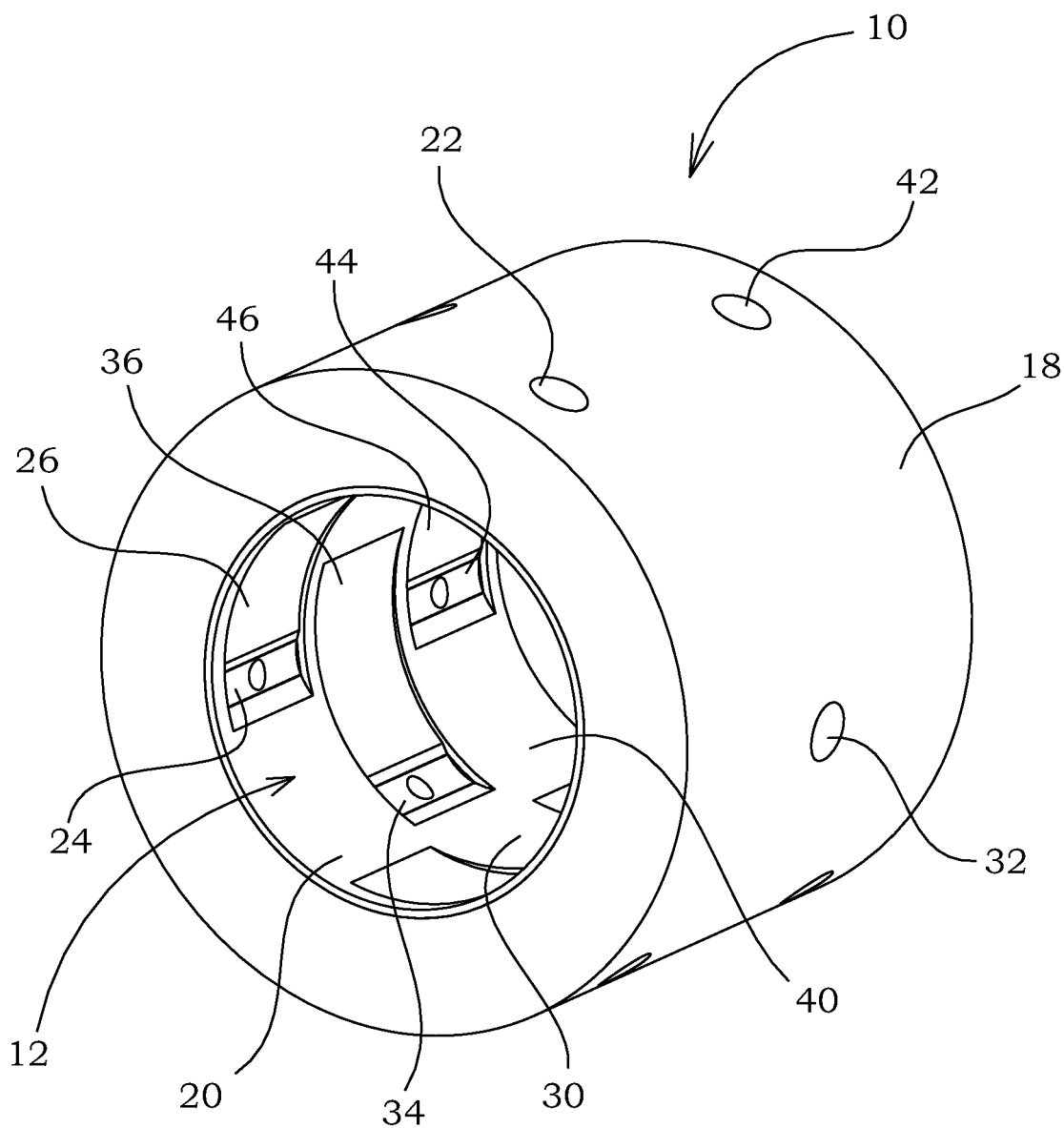
FIG. 2A provides a perspective view of a first illustrative embodiment of a bearing with axial variations.

A first illustrative embodiment of a bearing with axial variations 10 is shown in perspective in FIG. 2A. This embodiment may be designed to accommodate different shaft 8 diameters such that the diameter of the bore 12 formed in the main body 18 may be slightly larger than the outside diameter of the shaft 8. For example, in one embodiment the diameter of the bore 12 may be 3.509 inches, outside diameter of the main body 18 may be 5.600 inches, and the axial length of the main body 18 may be 3.500 inches such that the bearing with axial variations may accommodate a shaft 8 having a diameter of 3.5 inches. However, the specific dimensions of the bearing with axial variations 10 of features thereof in no way limit the scope thereof as disclosed and claimed herein, and the bearing with axial variations 10 extends to those designed to accommodate a shaft 8 of any diameter and any bearing with axial variation 10 having any outside diameter or axial length.

The bearing with axial variations 10 may include a main body 18 that may be configured as a two-piece design, wherein each piece of the main body 18 approximately constitutes one-half of the main body 18. Alternatively, the main body 18 may be formed as one integral member as shown for the embodiments pictured herein. Additionally, still other embodiments exist in which the bearing with axial variations 10 is formed from more than two pieces engaged with one another. It is contemplated that a bearing with axial variations 10 will achieve better performance (e.g., more stability, acceptable temperatures, etc.) for a wider range of performance requirements than that of prior art bearings 4, which requirements may be predetermined based on variable loads. Accordingly, it is contemplated that compared to the prior art, the bearing with axial variations 10 may increase the resistance to half-speed whirl while retaining similar load capacity, allowing the bearing/rotor system to operate at higher speeds or lighter shaft weights; increase film thickness at non-design points; decrease maximum bearing temperature at non-design points; and provide a higher safety margin.

The performance of a bearing with axial variations 10 may be increased compared to a prior art bearing 4 by configuring the bore 12 with additional features at different positions along the axial dimension of the bore 12. For example, the embodiment shown in FIG. 2A may include a first zone 20 configured with one or more radial holes 22 extending from the exterior surface of the bearing housing 18 through the bore 12. It is contemplated that lubricant may be supplied to features in the bore 12 via a lubricant supply source (not shown), such as a supply of pressurized lubricant. However, the specific method and/or apparatus used to supply lubricant to any radial hole 22, 32, 42 of any embodiment of the bearing with axial variations 10 in no way limits the scope of the present disclosure. As shown, the first zone 20 (which may be defined as the zone positioned to the right of FIG. 2C) may include three radial holes 22 equally spaced about the bore 12 (i.e., at 120 degrees from one another), which radial holes 22 may be configured to be in fluid communication with respective grooves 24 configured in the bore 12.

Each groove 24 and/or land 16 may be configured with a specific profile, geometry, and/or features therein (e.g., grooves, voids, pits, channels, tapers 26, axial notches, etc.) to cooperate with and/or optimize one or more lands 16 that may be configured on the bore 12. The specific profile, geometry, and/or features of any groove 24, 34, 44 and/or land 16 of any zone 20, 30, 40 in no way limits the scope of the bearing with axial variations 10 as disclosed and claimed herein. For example, one or more grooves 24, 34, 44 in an embodiment of a bearing with axial variation 10 may be configured as a lemon bore, with or without a taper 26, etc. without limitation. Generally, and without limitation, the specific configuration of the taper 26, 36, 46 (if present) will depend at least on the direction of relative rotation between the bearing with axial variations 10 and the shaft 8 or other structure that the bearing with axial variations 10 rotates with respect to. In another embodiment, the land 16 may be configured such that the cross-sectional shape thereof is generally semi-circular. Additionally, any radial hole 24, 34, 44 may have an infinite number of configurations (e.g., different or varying cross-sectional shapes along the length thereof, a larger diameter portion with a step to a smaller diameter portion (as shown in the first and second embodiments of a bearing with axial variations 10), etc.), and the specific configuration of any radial hole 24, 34, 44 in no way limits the scope of the present disclosure. Furthermore, the number of radial holes 22, 32, 42 in a given zone 20, 30, 40 need not be equal to the number of grooves 24, 34, 44 and/or tapers 26, 36, 46 in a given zone 20, 30, 40. The number of tapers 26, 36, 46 need not be equal to the number of grooves 24, 34, 44 in a given zone 20, 30, 40. That is, a first groove 24 in the first zone 20 may include a taper 26, but a second groove 24 therein may not. And the first groove 24 may be in fluid communication with a first radial hole 22, but the second groove 24 may not be associated with any radial hole 22.

Figure 2B:
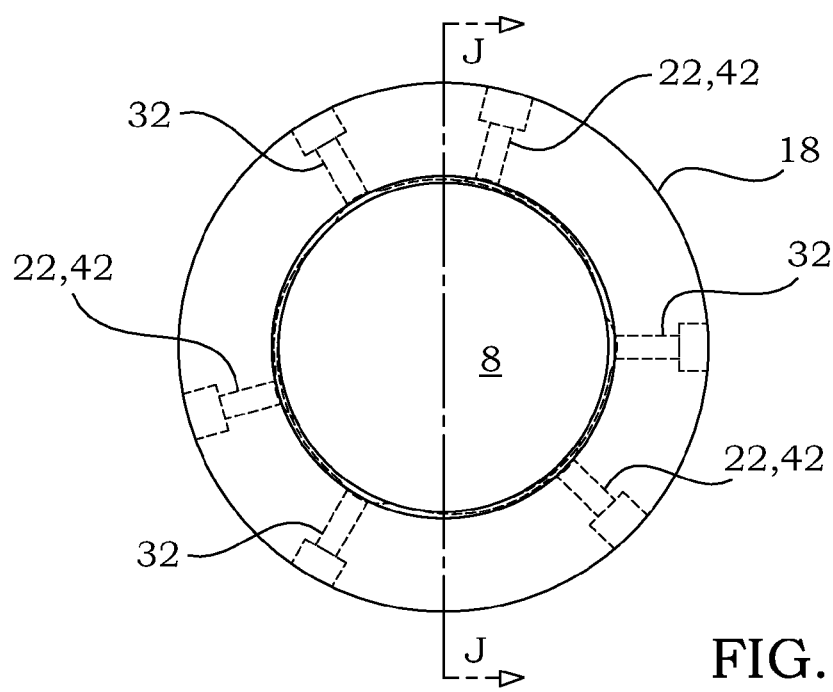
FIG. 2B provides an axial end view of the embodiment shown in FIG. 2A

The first embodiment of a bearing with axial variations 10 may also include a second zone 30, which may be similarly configured to the first zone 20 such that three radial holes 32 may be equally spaced about the bore 12 in the second zone 30. The radial holes 32 may be configured to be in fluid communication with a respective groove 34 configured in the bore 12. It is contemplated that the first zone 20 may be offset rotationally with respect to the second zone 30, which is best shown in FIG. 2B. This offset will vary from one embodiment of the bearing with axial variations 10 to the next, and in some bearings with axial variation 10 there will be no offset between zones 20, 30, but instead have differences in the features of the grooves 24, 34 formed in the respective zones 20, 30. In the first illustrative embodiment, the second zone 30 may be offset from the first zone 20 by approximately 40 degrees, but the specific offset from one zone 20, 30, 40 to the next in no way limits the scope of the present disclosure.

Figure 2C:
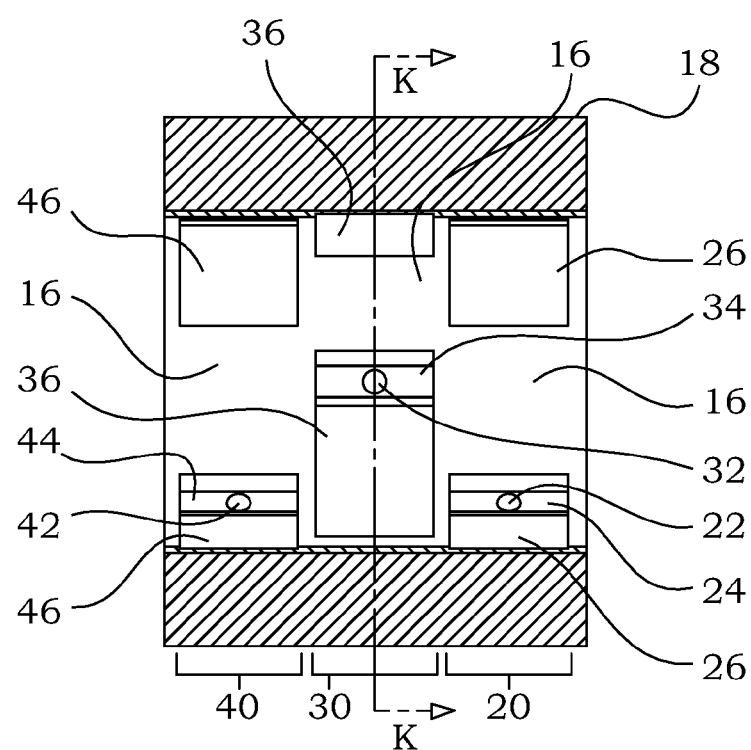
FIG. 2C provides an axial cross-sectional view of the embodiment shown in FIGS. 2A and 2B along line J-J from FIG. 2B.
Figure 2D:
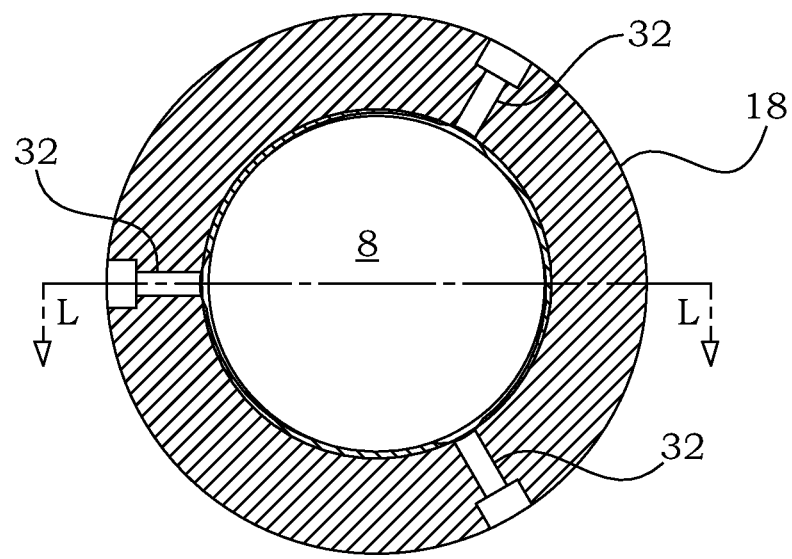
FIG. 2D provides a radial cross-sectional view of the embodiment shown in FIGS. 2A-2C along line K-K from FIG. 2C.
Figure 2E:
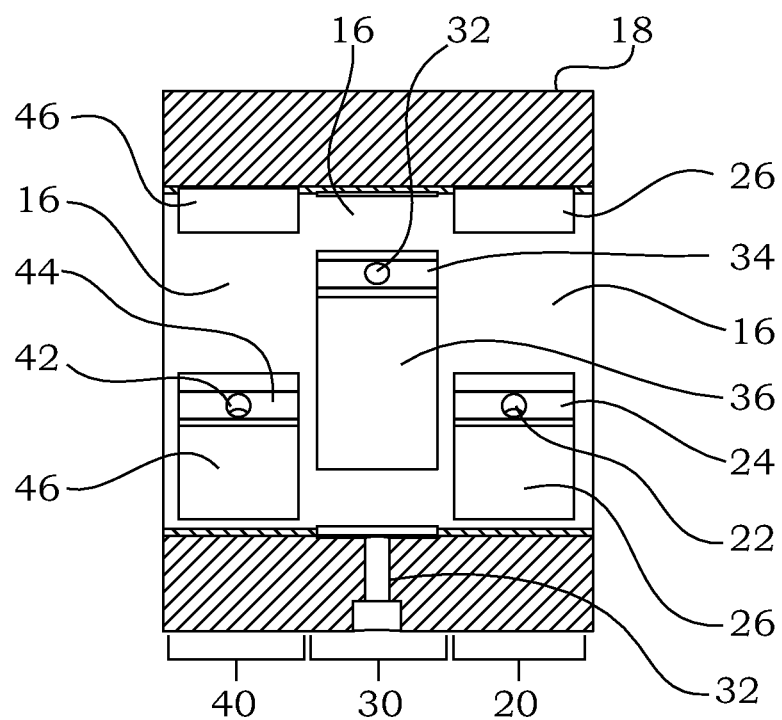
FIG. 2E provides an axial cross-sectional view of the embodiment shown in FIGS. 2A-2D along line L-L from FIG. 2D.

The first embodiment of a bearing with axial variations 10 may also include a third zone 40, which may be similarly configured to the first and second zones 20, 30 such that three radial holes 42 may be equally spaced about the bore 12 in the third zone 40. The radial holes 42 may be configured to be in fluid communication with a respective groove 44 configured in the bore 12. It is contemplated that the third zone 40 may be offset rotationally with respect to the second zone 30, which is best shown in FIGS. 2B & 2C. This offset will vary from one embodiment of the bearing with axial variations 10 to the next, and in some bearings with axial variation 10 there will be no offset between zones 30, 40 but instead have differences in the features of the grooves 34, 44 formed in the respective zones 30, 40. Additionally, in the illustrative embodiment shown in FIGS. 2A-2E, the first zone 20 may be at the same rotational position as the third zone 40, such that the offset therebetween is zero. In other embodiments of the bearing with axial variations 10, the first zone 20 may be offset with respect to the second zone 32 without limitation. Furthermore, the third zone 40 may be offset from both the first zone 20 and the second zone 30. Other embodiments of the bearing with axial variation 10 may include more than three zones 20, 30, 40, and still other embodiments include only two zones 20, 30. Accordingly, the number of zones 20, 30, 40 and/or their relative rotational offset with respect to one another in no way limits the scope of the present disclosure. Additionally, the axial offset between zones 20, 30, 40 may be of any length or of no length without limitation. That is, in some embodiments the axial offset of zones 20, 30, 40 may be zero, while in other embodiments the axial offset between zones 20, 30, 40 may be of a specific, predetermined length greater than zero. Accordingly, the number of zones 20, 30, 40 and/or their relative axial offset with respect to one another in no way limits the scope of the present disclosure.

Figure 3A:
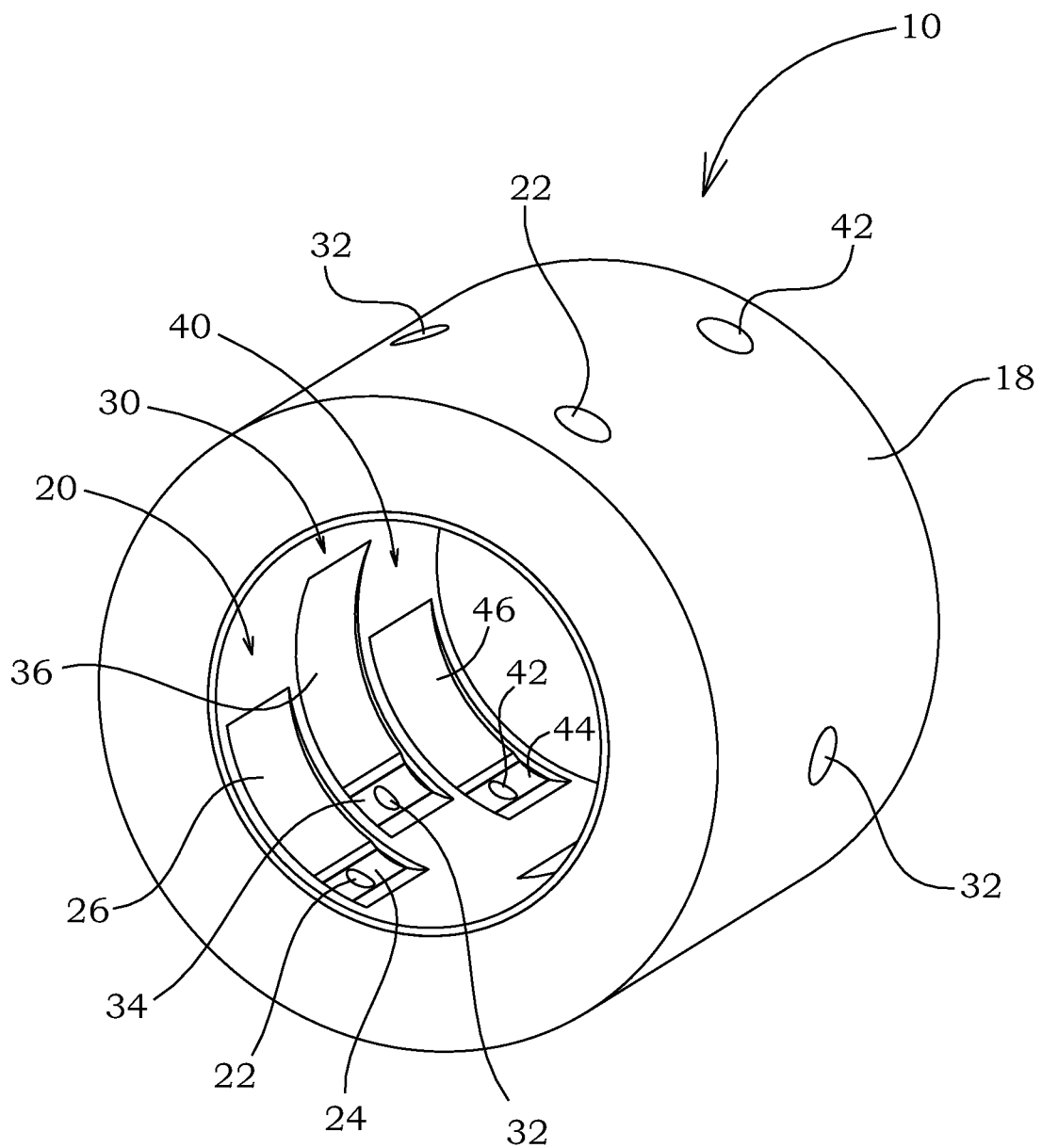
FIG. 3A provides a perspective view of a second illustrative embodiment of a bearing with axial variations.
Figure 3B:
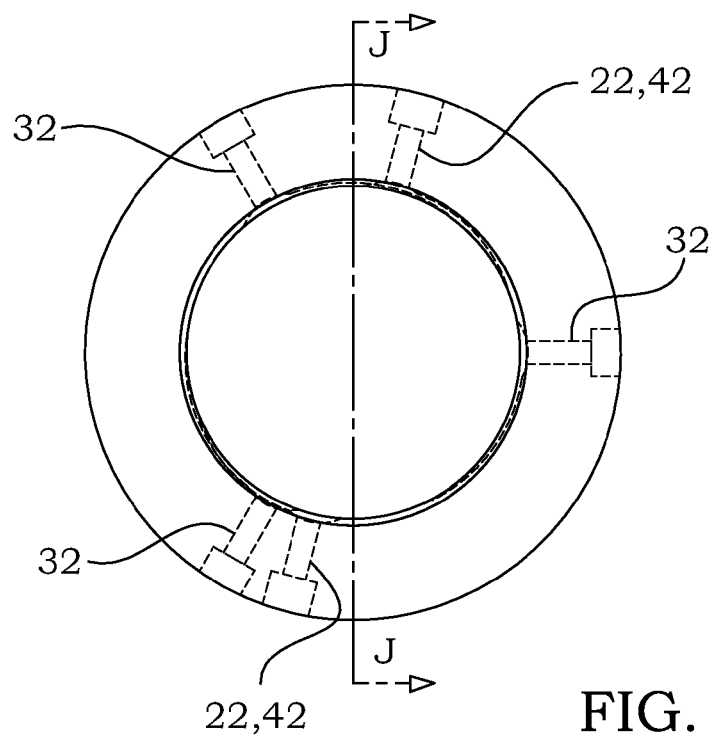
FIG. 3B provides an axial end view of the embodiment shown in FIG. 3A
Figure 3C:
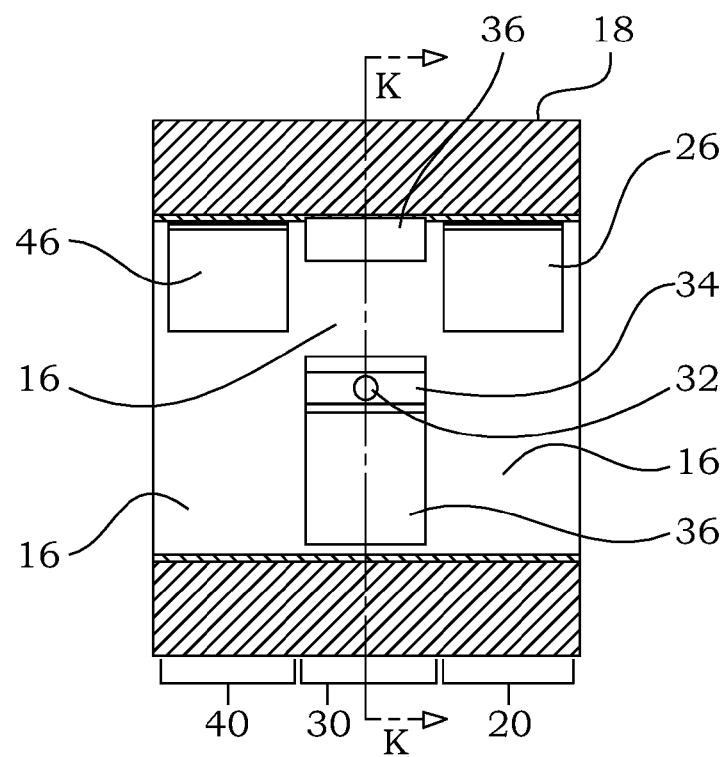
FIG. 3C provides an axial cross-sectional view of the embodiment shown in FIGS. 3A and 3B along line J-J from FIG. 3B.
Figure 3D:
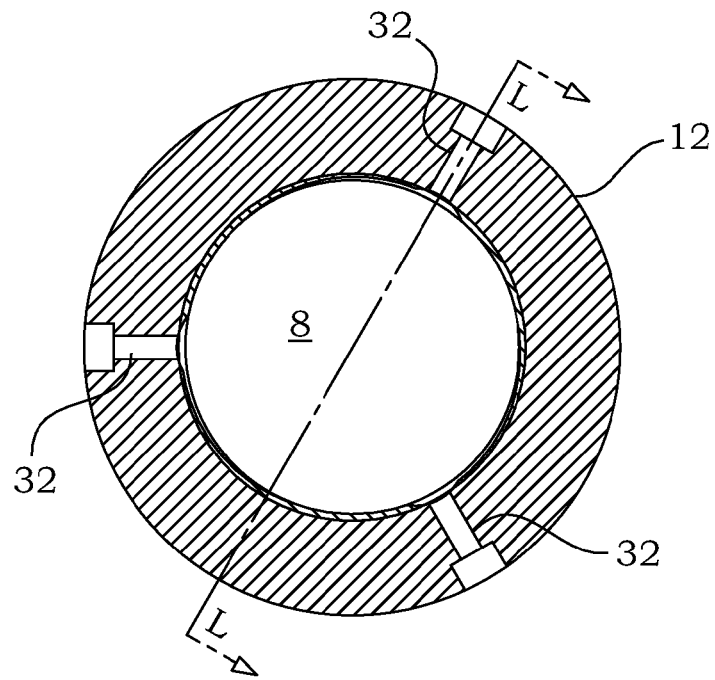
FIG. 3D provides a radial cross-sectional view of the embodiment shown in FIGS. 3A-3C along line K-K from FIG. 3C.
Figure 3E:
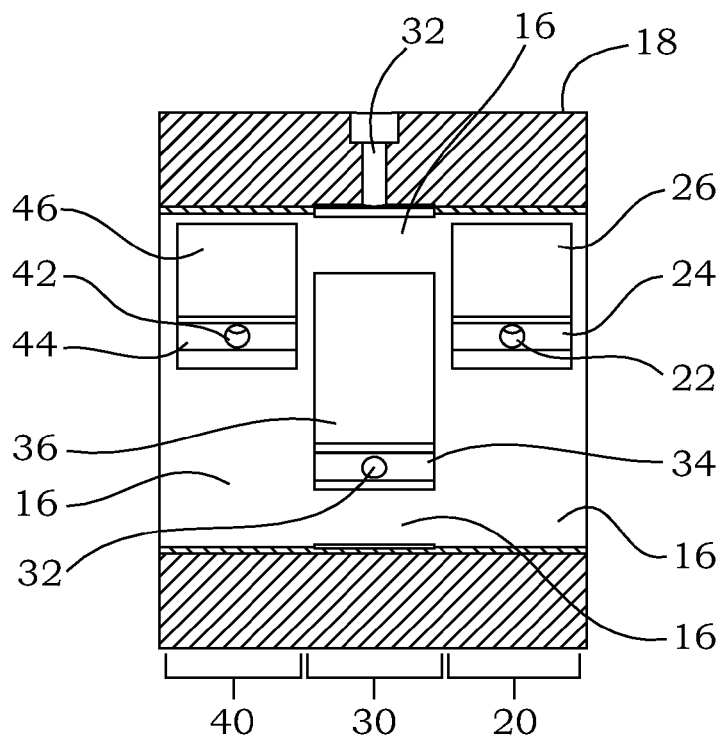
FIG. 3E provides an axial cross-sectional view of the embodiment shown in FIGS. 3A-3D along line L-L from FIG. 3D.

A second embodiment of a bearing with axial variations 10 is shown in FIGS. 3A-3F. As with the embodiment shown in FIGS. 2A-2E, this embodiment may include three zones 20, 30, 40, which is in no way limiting to the scope of the bearing with axial variations 10. The second illustrative embodiment is similar to the first illustrative embodiment except for the configuration of the first and third zones 20, 40 and the relative rotational offset between zones 20, 30, 40. In the second illustrative embodiment, the first and third zones 20, 40 may be formed with two radial holes 22, 42 opposed to one another such that they are separated by 180 degrees within their respective zones 20, 40, which is best shown in FIG. 3B. Again, the first and third zones 20, 40 may be rotationally aligned with one another. In the second illustrative embodiment, the first and third zones 20, 40, may be rotationally offset with respect to the second zone 30 by 15 degrees. However, as previously stated, the number of zones 20, 30, 40 and/or their relative rotational offset with respect to one another in no way limits the scope of the present disclosure.

Figure 4A:
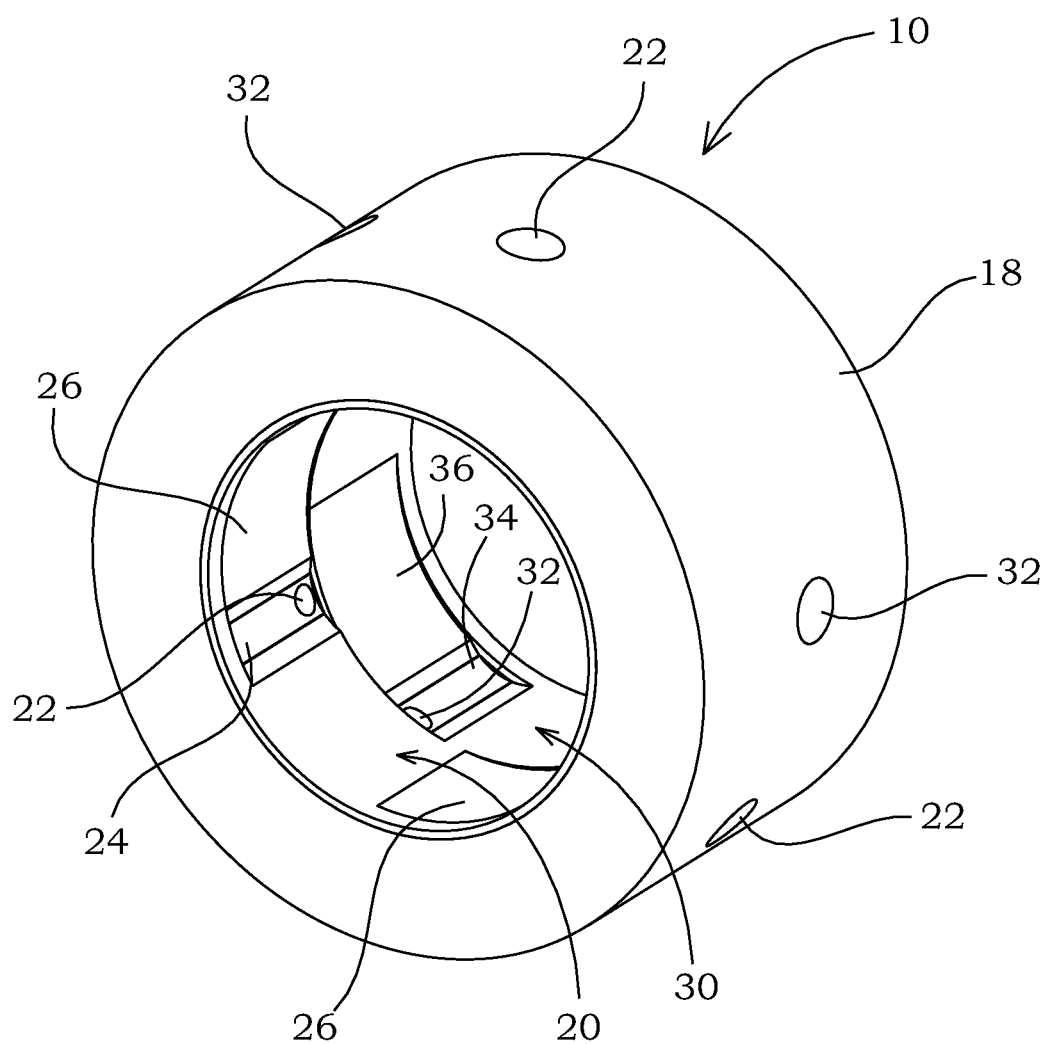
FIG. 4A provides a perspective view of a third illustrative embodiment of a bearing with axial variations.
Figure 4B:
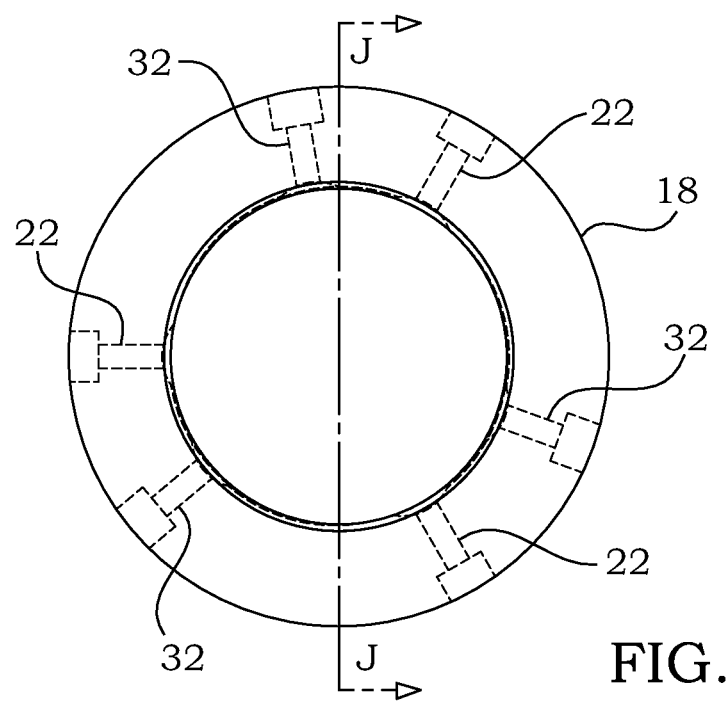
FIG. 4B provides an axial end view of the embodiment shown in FIG. 4A

A perspective view of third illustrative embodiment of a bearing with axial variations 10 is shown in FIG. 4A. This embodiment may include two zones 20, 30, having offset radial holes 22, 32, respectively, leading to grooves 24, 34 formed in the bore 12. Again, the rotational offset of the various zones 20, 30 may vary from one specific embodiment to the next, but may be approximately 40 degrees as pictured for the third illustrative embodiment of a bearing with axial variations 10.

Each radial hole 22, 32, 42 may intersect a groove 24, 34, 44 at a different position of the groove 24, 34, 44. For example, in the first and second illustrative embodiments, the radial holes 22, 32, 42 may intersect the respective grooves 24, 34, 44 approximately at the centerline of the groove 24, 34, 44 with respect to the axial dimension. However, in the third embodiment, the radial holes 22, 32 may intersect the respective grooves 24, 34 at an extreme end of the groove 24, 34 with respect to the axial dimension. As previously stated, the specific configuration of any grooves 24, 34, 44 and/or lands 16 in the bearing with axial variations 10 in no way limits the scope of the present disclosure. Accordingly, the bearing, with axial variations 10 extends to any groove 24, 34, 44 and/or land 16 configuration, including but not limited to variations in the axial position at which a radial hole 22, 32, 42 intersects a respective groove 24, 34, 44.

It is contemplated that a bearing with axial variations 10 with three zones 20, 30, 40 may be less likely than a bearing with axial variations 10 with two zones 20, 30 to misalign because three zones 20, 30, 40 (wherein the first and third zones 20, 40 may be rotationally aligned) may be more likely to have an equal axial pressure balance throughout. However, other embodiments of the bearing with axial variations 10 may include additional zones 20, 30, 40, such as fourth and fifth zones, etc. without limitation.

A fourth illustrative embodiment of a bearing with axial variations is shown in FIGS. 5A-5D. In this embodiment, the various grooves 24, 34, 44, land(s) 16, and/or features of the bearing with axial variations 10 may be configured on the outside diameter of the bearing with axial variation 10. Such an embodiment of the bearing with axial variation 10 may be configured such that it may rotate relative to a main body, and the main body may be formed with a bore therein to accommodate the bearing with axial variations 10. In such a configuration, the main body may rotate and the bearing with axial variations 10 may be stationary, or vice versa. Alternatively, both the bearing with axial variations 10 and the main body 18 may rotate, albeit at different rates. Accordingly, the configuration of stationary and/or rotating components in no way affects the scope of the bearing with axial variations 10 as disclosed and claimed herein.

Figure 5A:
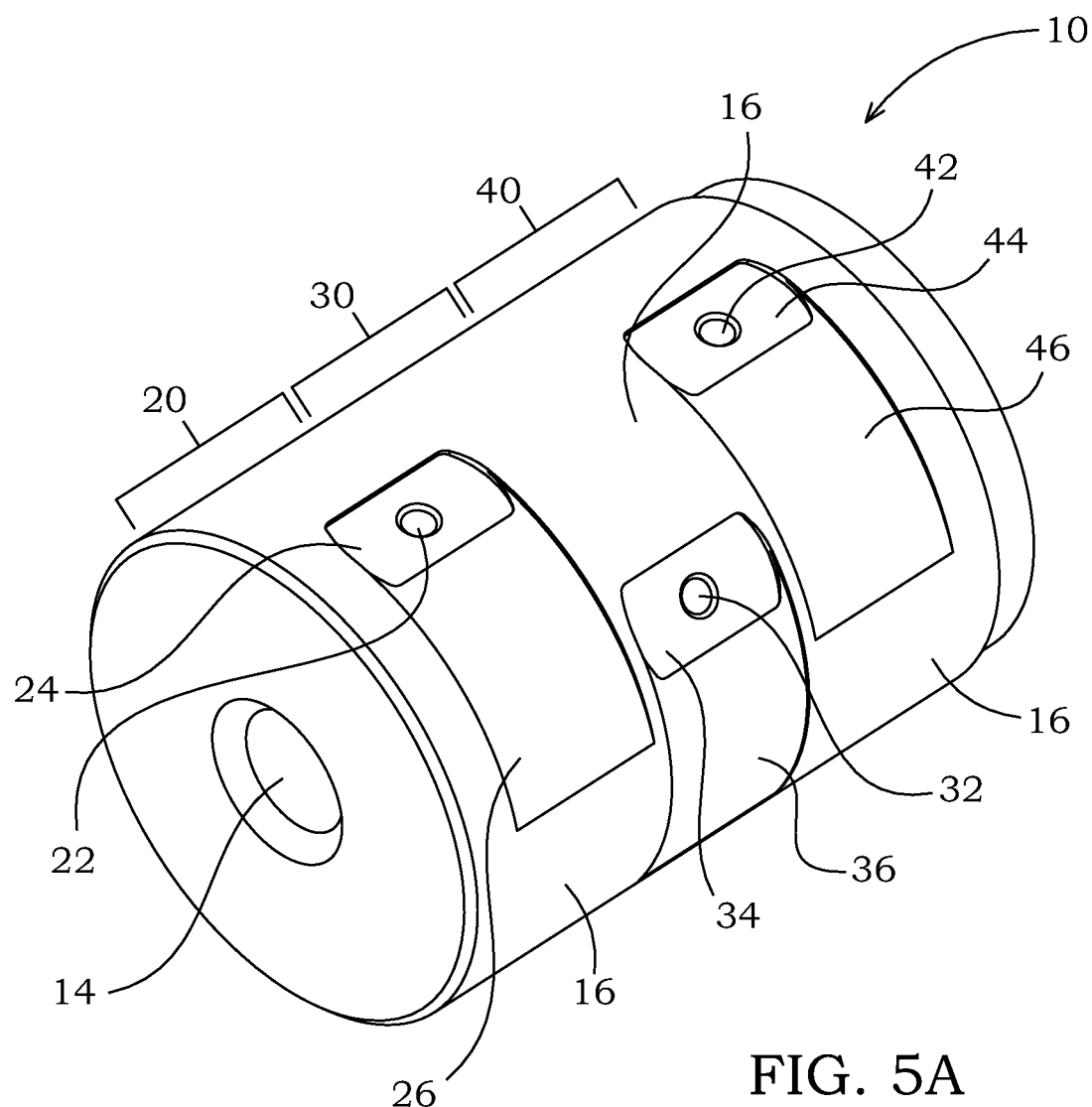
FIG. 5A provides a perspective view of a fourth illustrative embodiment of a bearing with axial variations, wherein the axial variations are on the outside diameter.

As mentioned, a main body may be configured with a bore into which the bearing with axial variation 10 may be positioned. This embodiment may be configured such that the radial cross-sectional shape of the bore is generally circular, although it may or may not be concentric with a centerline of the main body. The cross-sectional shape of the embodiment of a bearing with axial variations 10 shown in FIGS. 5A 5D, also may be generally circular in shape. However, other embodiments may have different radial and/or axial cross-sectional shapes without limitation, which may correspond to different cross-sectional shapes of a bore and/or main body having a bore formed therein. In the embodiment pictured in FIGS. 5A-5D, the axial variations may be configured on the outside diameter, rather than on the bore 12 as described for the previous embodiments. A perspective view of the fourth embodiment is shown in FIG. 5A. This embodiment may include three zones 20, 30, 40, and one or more grooves 24, 34, 44 may be configured in each zone 20, 30, 40, respectively. However, as with the previous embodiments described above, other embodiments with features on the outside diameter may include additional zones 20, 30, 40, such as fourth and fifth zones, etc., and/or additional features in each groove 24, 34, 44, and/or land 16 (such as tapers 26, 36, 46, notches, etc.) without limitation.

Figure 5B:
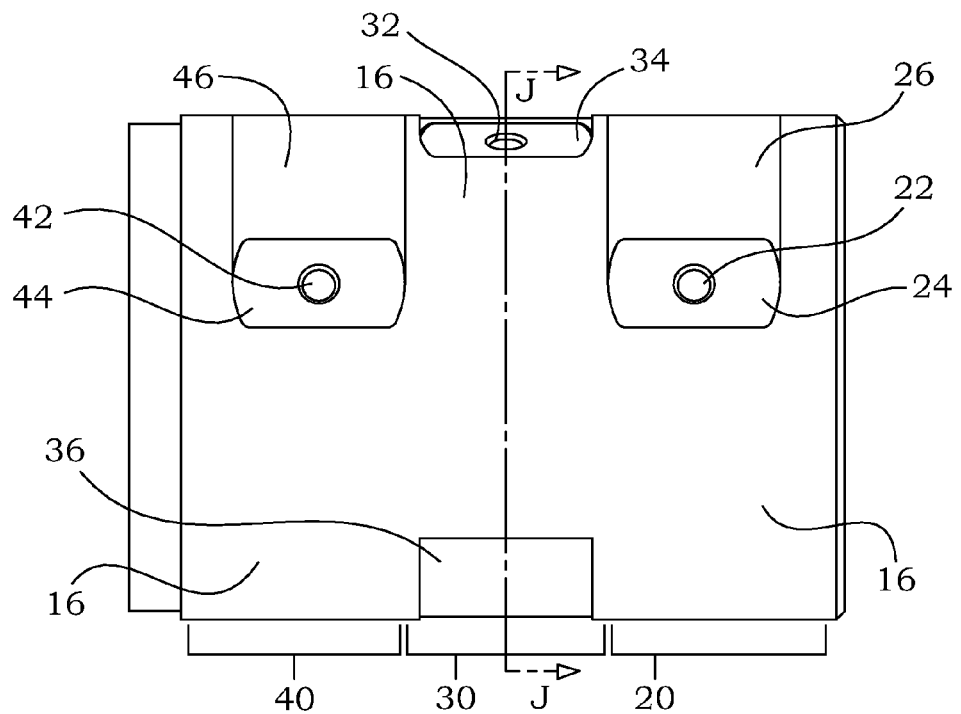
FIG. 5B provides a detailed side view of a portion of the embodiment shown in FIG. 5A.

As shown in FIGS. 5A & 5B, a land 16 may be located adjacent a groove 24, 34, 44 and/or integrated therewith. The area opposite the land 16 adjacent a groove 24, 34, 44 may have any configuration suitable for the particular application of the bearing with axial variations 10. For example, that area may be configured with a taper 26, 36, 46 or it may have a different profile and/or features therein. Alternatively, that area may not be configured with a profile therein and simply be configured as a smooth arc. A specific configuration is shown in FIG. 5B, wherein the groove 24 may have a specific taper 26 and undercut. Other embodiments may have different configurations of grooves 24, 34, 44 with or without a taper 26, 36, 46 and/or other profiles or features formed therein without limitation.

Figures 5C, 5D:
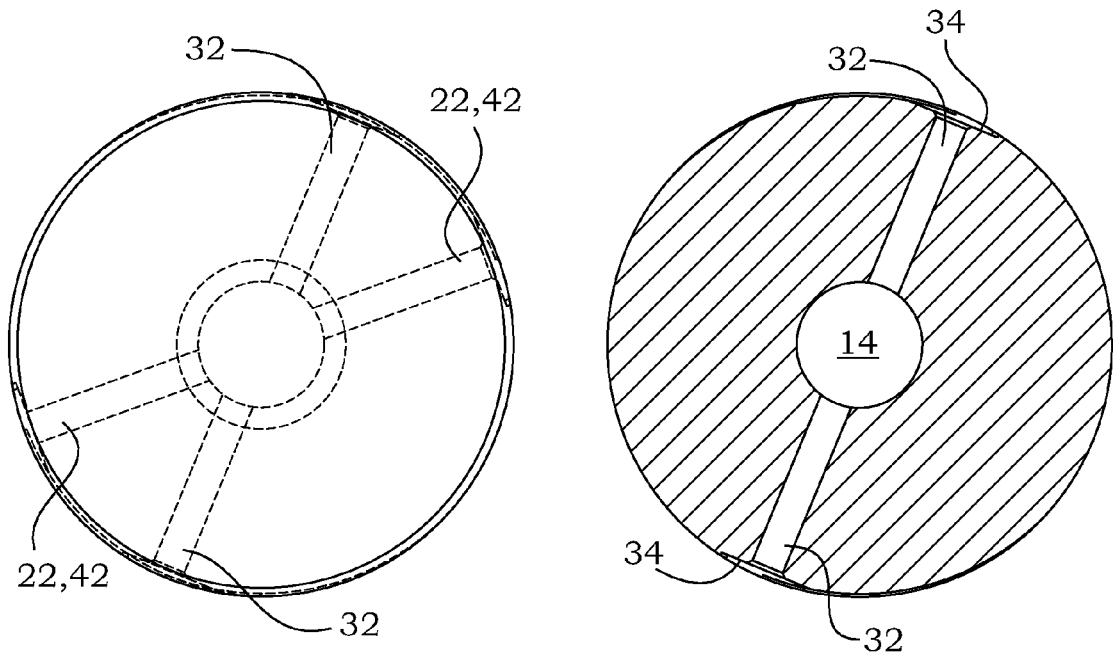
FIG. 5C provides an axial end view of the embodiment shown in FIGS. 5A & 5B.
FIG. 5D provides a radial cross-sectional view of the embodiment shown in FIGS. 5A & 5B along line J-J from FIG. 5B.

As shown in FIGS. 5C & 5D, an axial channel 14 may be configured on the interior of the bearing with axial variations 10 along the longitudinal axis thereof. The axial channel 14 may be in fluid communication with one or more radial holes 22, 32, 42. It is contemplated that lubricant may be supplied to one or more radial holes 22, 32, 42 via a lubricant supply source (not shown), such as a supply of pressurized lubricant. However, the specific method and/or apparatus used to supply lubricant to any radial hole 22, 32, 42 of any embodiment of the bearing with axial variations 10 in no way limits the scope of the present disclosure. In the fourth embodiment, the first, second, and third zones 20, 30, 40 may be configured with two radial holes 22, 32, 42 opposed to one another at 180 degrees, wherein the radial holes 22, 32, 42 may be in fluid communication with two respective grooves 24, 34, 44 in the respective zones 20, 30, 40. The radial holes 32 in the second zone 30 may be rotationally offset from those in the first and/or third zones 20, 40 by approximately 40 degrees. However, as previously described above for other embodiments of the bearing with axial variations 10, the orientation and/or number of zones 20, 30, 40; radial holes 22, 32, 42; grooves 24, 34, 44 and/or lands 16 in any of the zones 20, 30, 40 are in no way limiting.

Figure 4C:
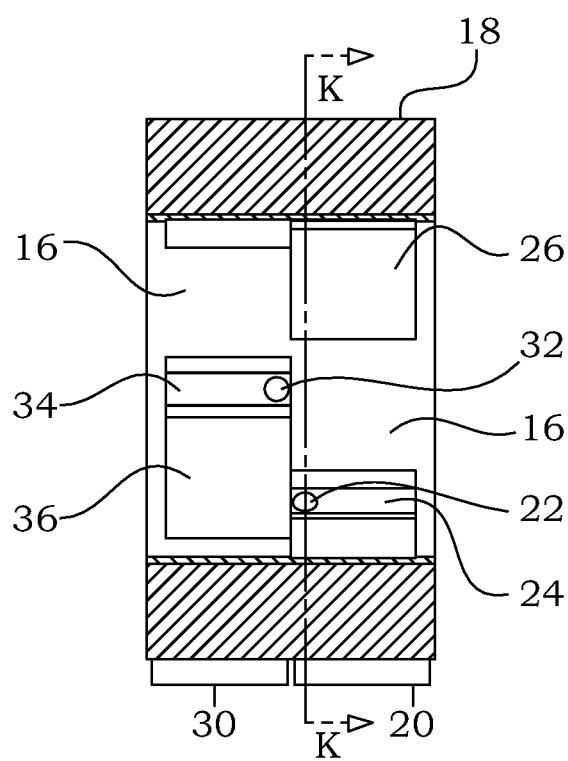
FIG. 4C provides an axial cross-sectional view of the embodiment shown in FIGS. 4A and 4B along line J-J from FIG. 4B.
Figure 4D:
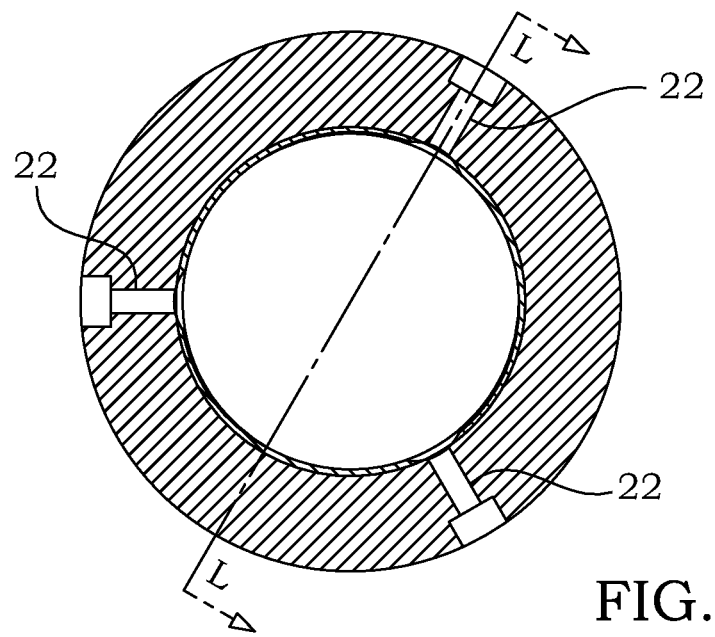
FIG. 4D provides a radial cross-sectional view of the embodiment shown in FIGS. 4A-4C along line K-K from FIG. 4C.
Figure 4E:
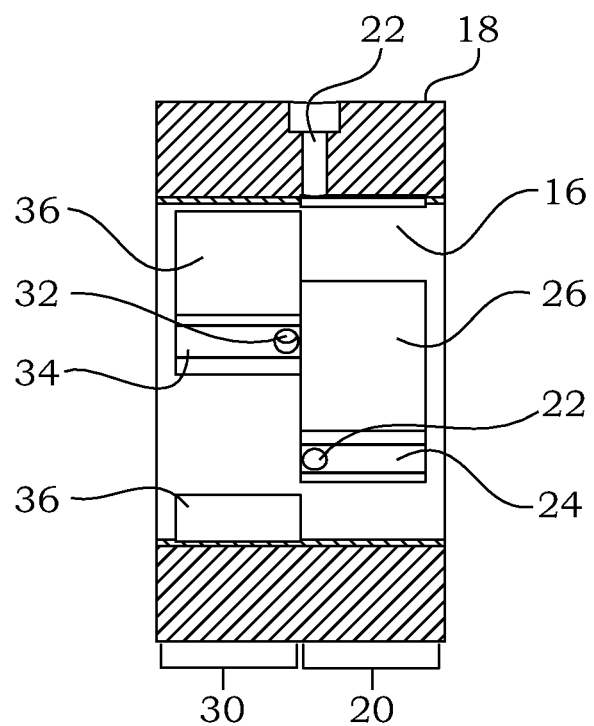
FIG. 4E provides an axial cross-sectional view of the embodiment shown in FIGS. 4A-4D along line L-L from FIG. 4D.
Figure 6A:
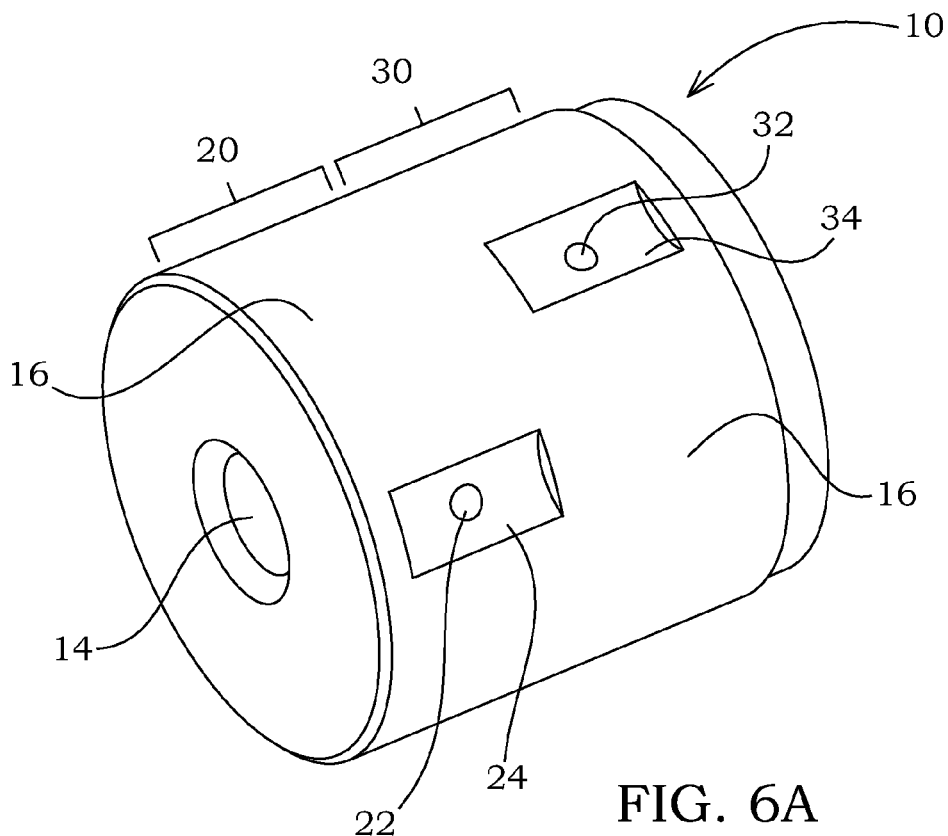
FIG. 6A provides a perspective view of a fifth illustrative embodiment of a bearing with axial variations, wherein the axial variations are on the outside diameter.

A fifth illustrative embodiment of a bearing with axial variations is shown in FIGS. 6A-6E. This embodiment may be configured similarly to that shown in FIGS. 5A-5D wherein the loves 24, 34 and land(s) 16 are positioned on the outside diameter of the bearing with axial variation 10. Accordingly, the fifth illustrative embodiment may be configured such that the radial cross-sectional shape thereof is generally circular, although it may or may not be concentric with the centerline of a main body configured to accept the bearing with axial variations 10. Other embodiments may have different radial cross-sectional shapes without limitation. A perspective view of the fifth embodiment is shown in FIG. 6A. This embodiment may include two or more zones 20, 30 and one or more grooves 24, 34 may be configured in each zone 20, 30, respectively. In this embodiment, the first and second zones 20, 30 may be rotationally offset with respect to one another. However, as previously described above for other embodiments of the bearing with axial variations 10, the orientation and/or number of zones 20, 30; radial holes 22, 32; grooves 24, 34 and/or lands 16 in any of the zones 20, 30, 40 are in no way limiting. The axial offset between features in any given zone 20, 30, 40 and/or between the zones 20, 30, 40 themselves may be of any length, including zero (as shown for the axial offset in the embodiment pictured in FIG. 4C) without limiting the scope of the present disclosure, as described in detail above.

Figure 6B:
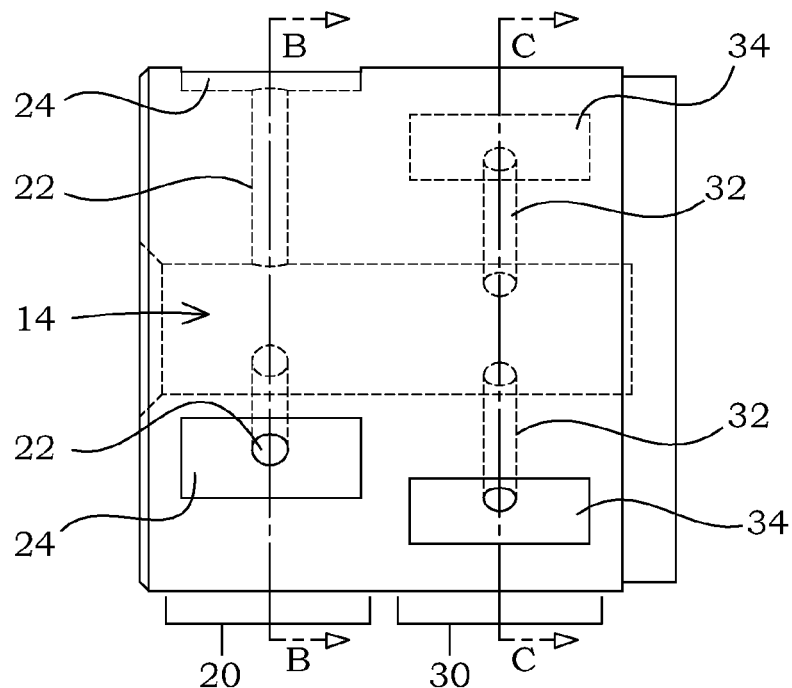
FIG. 6B provides a detailed side view of a portion of the embodiment shown in FIG. 6A.

As shown in FIG. 6B, a land 16 may be located adjacent a groove 24, 34 on either side thereof. Alternatively, on one or both areas adjacent a groove 24, 34 there may be a different configuration suitable for the particular application of the bearing with axial variations 10. For example, that area may be tapered or have a different profile. Alternatively, that area may be formed without a profile therein. The grooves 24, 34 for the embodiment shown in FIGS. 6A-6D may have the specific configuration is shown in FIG. 5C, wherein the groove 24 may have a specific taper 26 and undercut. Other embodiments may have different configurations of grooves 24, 34 with or without a taper 26, 36 or other profile and/or features formed therein without limitation. A different configuration for the grooves 24, 34 is shown in the embodiment pictured in FIG. 6E, wherein the grooves 24, 34 may include a specifically configured profile and/or taper 26, 36, therein. Additionally, the embodiment pictured in FIG. 6E may include a notch 15 positioned adjacent one or more sides of each groove 24, 34 to provide a pathway for lubricant.

Figure 6C:
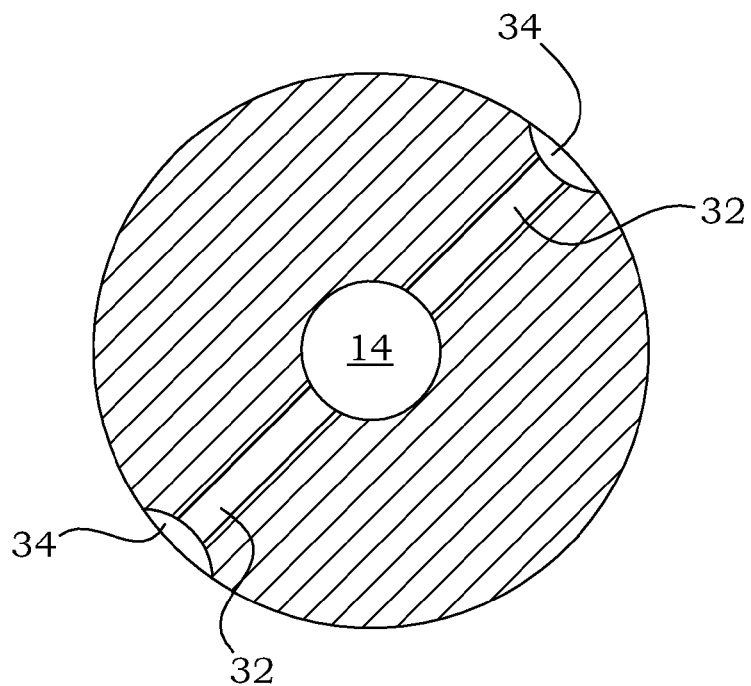
FIG. 6C provides a radial cross-sectional view of the embodiment shown in FIG. 6B along line C-C.
Figure 6D:
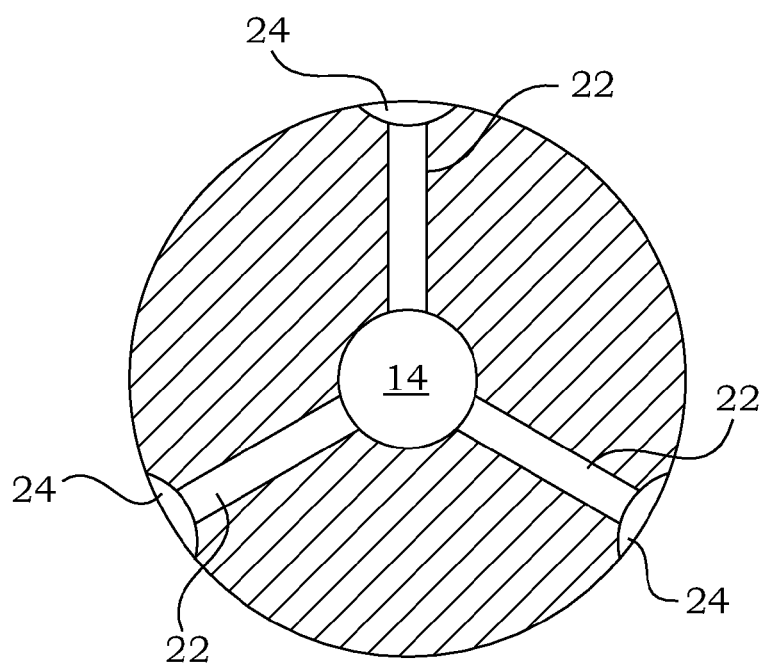
FIG. 6D provides a radial cross-sectional view of the embodiment shown in FIG. 6B along line B-B.

As shown in FIGS. 6C & 6D, an axial channel 14 may be configured on the interior of the bearing with axial variations 10, which axial channel 14 may be in fluid communication with one or more radial holes 22, 32. Referring specifically to FIG. 6D, in the fifth embodiment, the first zone 20 may be configured with three radial holes 22 spaced from one another by 120 degrees, wherein the radial holes 22 may be in fluid communication with three respective grooves 24. However, as previously described above for other embodiments of the bearing with axial variations 10, the orientation and/or number of zones 20, 30, 40; radial holes 22, 32, 42; grooves 24, 34, 44 and/or lands 16 in any of the zones 20, 30, 40 are in no way limiting.

As shown in FIG. 6C, the axial channel 14 may be configured such that the axial channel 14 may be in fluid communication with two radial holes 32 formed in the second zone 30. In the fifth embodiment, the second zone 30 may be configured with two radial holes 32 spaced from one another by 180 degrees, wherein the radial holes 32 may be in fluid communication with two respective grooves 34 formed in the second zone 30. The radial holes 32 in the second zone 30 may be rotationally offset from those in the first zone 20. In the embodiment shown in FIGS. 6A-6E the first zone 20 may be radially offset from the second zone 30 by approximately 15 degrees. However, as previously described above for other embodiments of the bearing with axial variations 10, the orientation and/or number of zones 20, 30, 40; radial holes 22, 32, 42; grooves 24, 34, 44 and/or lands 16 in any of the zones 20, 30, 40 are in no way limiting.

Figure 6E:
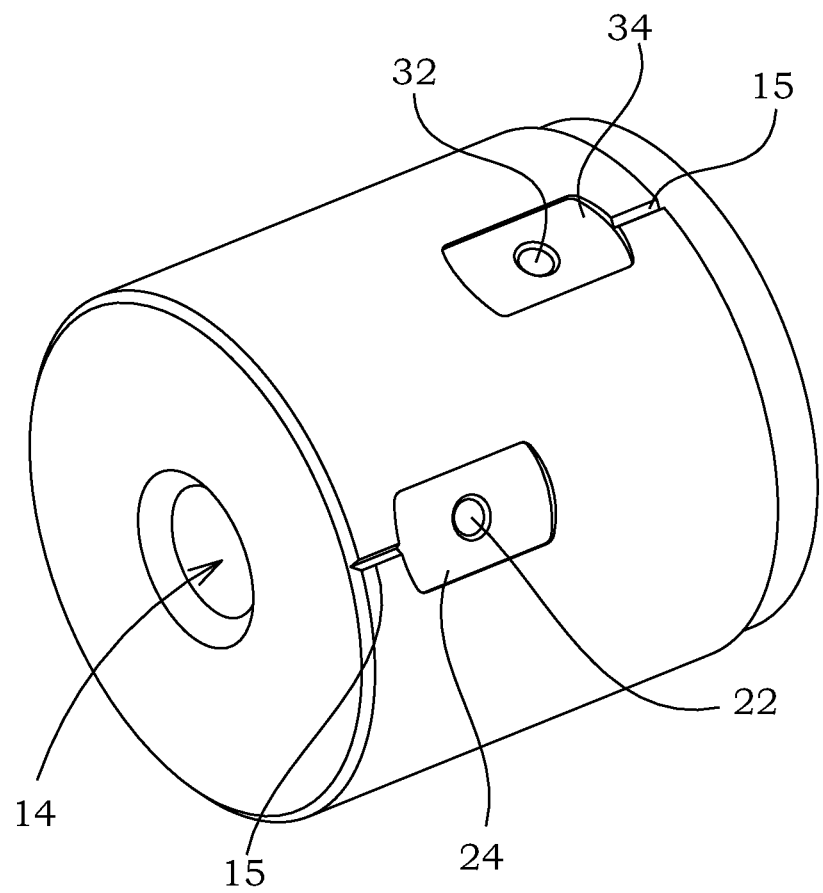
FIG. 6E provides side view of a portion of an embodiment similar to that shown in FIG. 6A, wherein the grooves are configured differently.

A variation of the grooves 24, 34 is shown in FIG. 6E. In this embodiment of a groove 24, 34, each groove 24, 34 may include a notch 15 formed in one or more axial ends thereof. The notch 15 may provide a pathway for lubricant to exit the groove 24, 34 upon specific, predetermined conditions. The radial holes 22, 32 for the bearing with axial variations 10 shown in FIG. 6E may have any configuration disclosed herein without limitation. Additionally, notches 15 may be included in any of the grooves 24, 34, 44 and/or lands 16 of any embodiments disclosed herein without limitation.

Figure 7A:
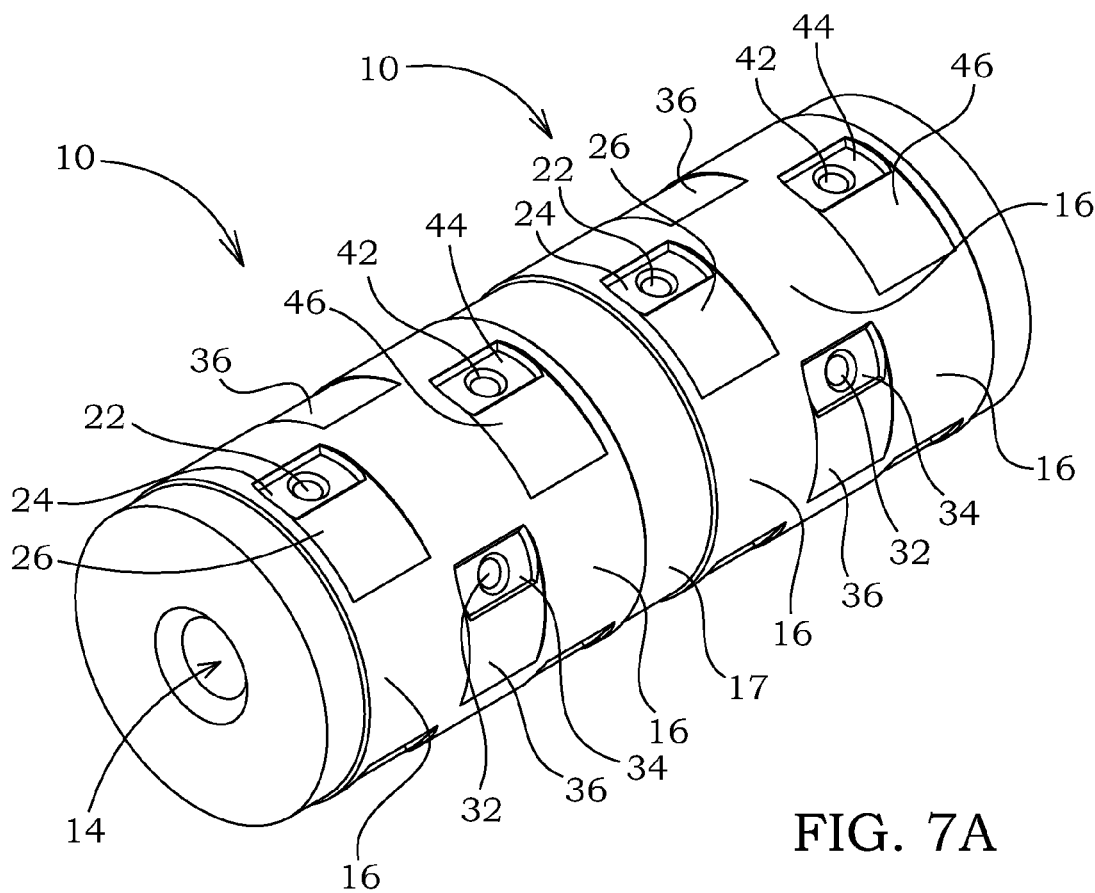
FIG. 7A provides a perspective view of a sixth illustrative embodiment of a bearing with axial variations, wherein the axial variations are on the outside diameter.

A sixth illustrative embodiment of a bearing with axial variations is shown in FIGS. 7A-7E. A perspective view of the sixth embodiment is shown in FIG. 7A. This embodiment may be formed as two discrete bearings with axial variations 10 separated by a spacer 17. The two bearings with axial variations 10 may be integrally formed with one another and/or the spacer 17, or the bearings with axial variations 10 and/or spacer 17 may be separately formed and later engaged with one another. For brevity, illustrative features of one of the bearings with axial variations 10 will be described in detail, with the understanding that those features may be applied to the other bearing with axial variations 10 opposite the spacer 17. Furthermore, although the embodiment shown in FIGS. 7A-7E includes two discrete bearings 10, in other embodiments additional bearings with axial variations 10 and/or spacers 17 may be included without limitation.

This embodiment may be configured similarly to the embodiments shown in FIGS. 5A-6E wherein the land(s) 16 is positioned on the outside diameter of the bearing with axial variation 10. Accordingly, the sixth illustrative embodiment may be configured such that the radial cross-sectional shape thereof is circular, although it may or may not be concentric with the centerline of a bore termed in the main body. Other embodiments may have different radial cross-sectional shapes without limitation.

Each bearing with axial variations 10 may include two or more zones 20, 30, 40 and one or more grooves 24, 34, 44, and/or lands 16 may be configured in each zone 20, 30, 40, respectively. However, as previously described above for other embodiments of the bearing with axial variations 10, those having one or more bearings with axial variations 10 positioned adjacent one another (with or without a spacer 17 positioned therebetween), the orientation and/or number of zones 20, 30, 40; radial holes 22, 32, 42; grooves 24, 34, 44 and/or lands 16 in any of the zones 20, 30, 40 are in no way limiting.

Figure 7B:
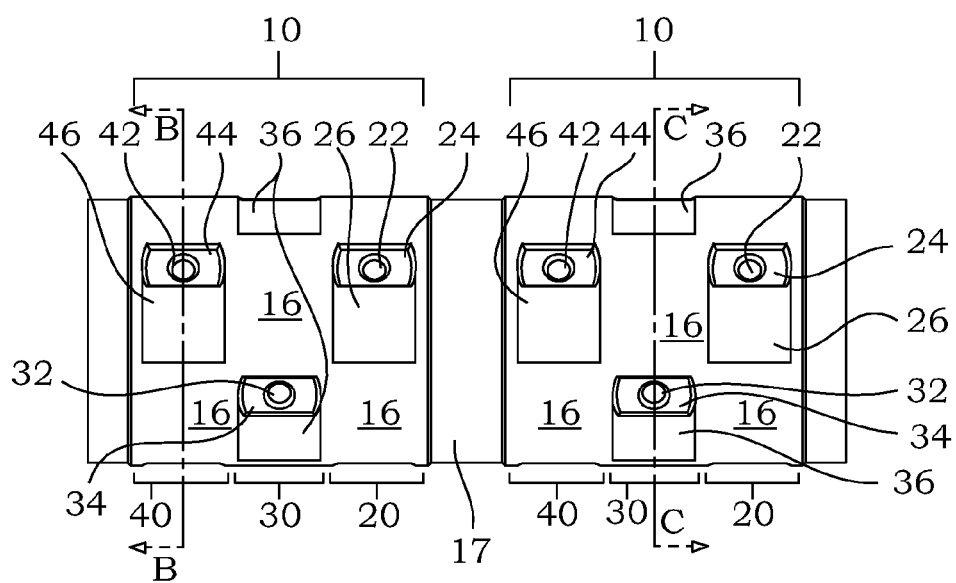
FIG. 7B provides a detailed side view of a portion of the embodiment shown in FIG. 7A.
Figure 7C:
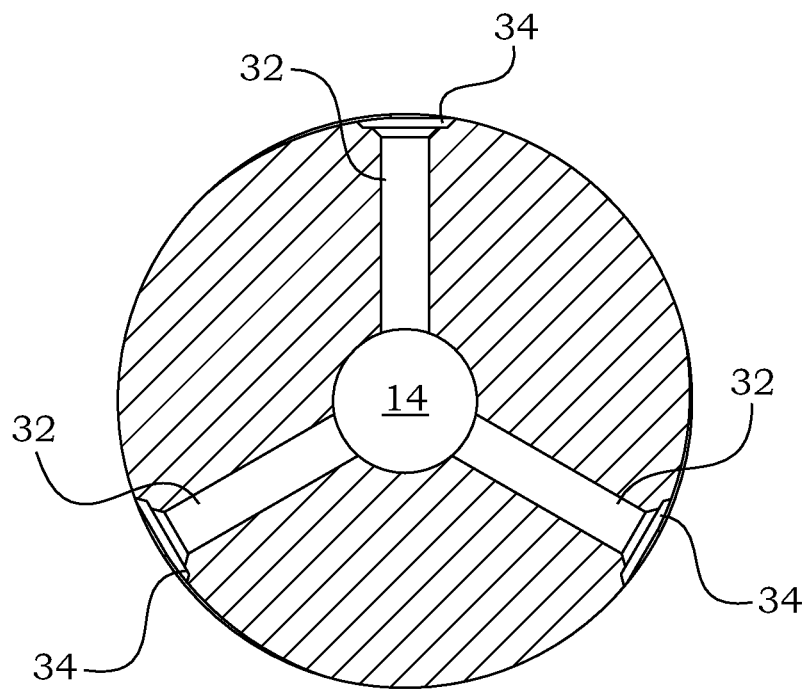
FIG. 7C provides a radial cross-sectional view of the embodiment shown in FIG. 7B along line C-C.
Figure 7D:
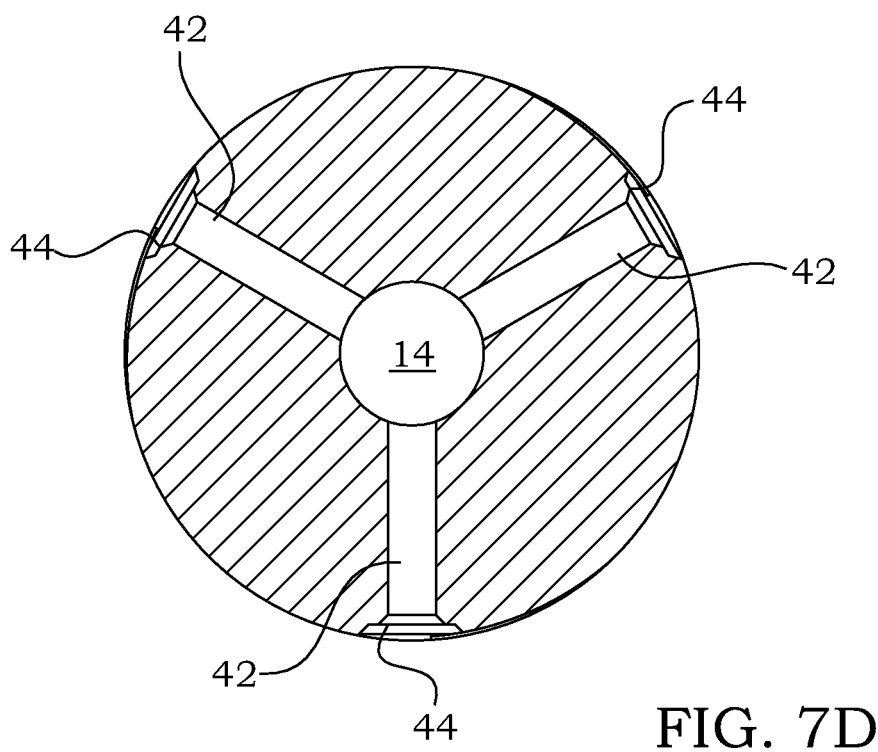
FIG. 7D provides a radial cross-sectional view of the embodiment shown in FIG. 7B along line B-B.

As shown in FIG. 7B, a land 16 and/or a taper 36, 46 may be located adjacent a groove 24, 34, 44 on either side thereof. Generally, and without limitation, the specific configuration of the taper 26, 36, 46 (if present) will depend at least on the direction of relative rotation between the bearing with axial variations 10 and the main body or other structure that the bearing with axial variations 10 rotates with respect to. Alternatively, on one or both areas adjacent a groove 24, 34, 44 there may be a different configuration suitable for the particular application of the bearing with axial variations 10. For example, one or more areas adjacent a groove 24, 34, 44 may include a taper 26, 36, 46 and/or or notch 15 thereon, or have a different profile. Alternatively, that area may be formed without a profile therein, such as the embodiment pictured in FIG. 6A. The grooves 24, 34, 44 for the embodiment shown in FIGS. 7A-7D may have the specific configuration is shown in FIGS. 7C & 7D, wherein the grooves 24, 34, 44 may be formed with a specific taper 26, 36, 46 and undercut. Other embodiments may have different configurations of grooves 24, 34, 44 and/or lands 16 with or without a taper 26, 36, 46 or other profile formed therein without limitation.

As shown in FIGS. 7C and 7D, an axial channel 14 may be configured on the interior of the bearing with axial variations 10, which axial channel 14 may be in fluid communication with one or more radial holes 22, 32, 42 formed in the respective zones 20, 30, 40. In the sixth embodiment, the first, second, and third zones 20, 30, 40 may be configured with three radial holes 22, 32, 42 spaced from adjacent radial holes 22, 32, 42 in the same zone 20, 30, 40 by 120 degrees. Each radial hole 22, 32, 42 may be in fluid communication with three respective grooves 24, 34, 44 formed in the respective zones 20, 30, 40. The first and third zones 20, 40 may be rotationally offset from the second zone 30 by approximately 60 degrees. However, as previously described above for other embodiments of the bearing with axial variations 10, the orientation and/or number of zones 20, 30, 40; radial holes 22, 32, 42; grooves 24, 34, 44 and/or lands 16 in any of the zones 20, 30, 40 are in no way limiting.

The number, configuration, dimensions, geometries, and/or relative locations of the zones 20, 30, 40; radial holes 22, 32, 42; grooves 24, 34, 44; notches 15, and/or lands 16 will vary from one embodiment of the bearing with axial variations 10 to the next, as will the optimal configuration thereof. Accordingly, the bearing with axial variations 10 as disclosed and claimed herein is in no way limited by the specific constraints of those elements. In addition to optimizing the rotational offset between zones 20, 30, 40, the number of features (e.g., radial holes 22, 32, 42; grooves 24, 34, 44; grooves, tapers, profiles; etc.) grooves 24, 34, 44; and/or lands 16 and the configuration thereof may be optimized for specific operational requirements and/or constraints.

The bearing with axial variations 10 and/or concepts thereof as disclosed and claimed herein may extend to any bearing with a fixed profile, including but not limited to plain cylindrical bore bearings, elliptical bore bearings, taper land bore bearings, pressure dam bore bearings, tilting pad journal bearing, and offset half bearings. Furthermore, the present disclosure may be applied to counter shaft or other mechanical elements in which a rotating member is positioned adjacent a non-rotating member.

The optimal number, dimensions, geometries, relative placement, shapes, and/or configuration of the zones 20, 30, 40; radial holes 22, 32, 42; grooves 24, 34, 44; notches 15, and/or lands 16 will vary from one embodiment of the bearing with axial variations 10 to the next, and are therefore in no way limiting to the scope thereof. The various elements of an apparatus using at least one feature of the present disclosure may be formed of any material that is suitable for the application for which the apparatus is used. Such materials include but are not limited to metals and their metal alloys, polymeric materials, and/or combinations thereof.

Although the specific embodiments pictured and described herein pertain to bearings having two or three radial holes 22, 32, 42 and two or three grooves 24, 34, 44 evenly spaced about the circumference of the bearing with axial variations 10, the bearing with axial variations 10 may be configured with other orientations and/or with different quantities of the various elements having different shapes and/or orientations, equally or unequally spaced from other elements within a given zone 20, 30, 40 or from elements in a different zone 20, 30, 40. Furthermore, the radial holes 22, 32, 42 may be applied to structures other than bearings, as described above. Accordingly, the scope of the present disclosure is in no way limited by the specific shape, configuration, and/or dimensions of the above elements, and/or the relative quantities and/or positions thereof.

Having described the preferred embodiments, other features, advantages, and/or efficiencies of the present disclosure will undoubtedly occur to those versed in the art, as will numerous modifications and alterations of the disclosed embodiments and methods, all of which may be achieved without departing from the spirit and scope of the present disclosure as disclosed and claimed herein. Furthermore, variations and modifications of the foregoing are within the scope of the bearing with axial variations 10. It is understood that the scope of the bearing with axial variations 10 as disclosed herein extends to all alternative combinations of one or more of the individual features mentioned or evident from the text and/or drawings. All of these different combinations constitute various alternative aspects of the bearing with axial variations 10. The embodiments described herein explain the best modes known for practicing the bearing with axial variations and will enable others skilled in the art to utilize the same. The claims are to be construed to include alternative embodiments to the extent permitted by the prior art.

It should be noted that the present disclosure is not limited to the specific embodiments pictured and described herein, but are intended to apply to all similar apparatuses for evenly accommodating different load requirements in a single apparatus. Modifications and alterations from the described embodiments will occur to those skilled in the art without departure from the spirit and scope of the present disclosure.

A first illustrative embodiment of a countershaft 100 according to the present disclosure is shown in FIGS. 8A-8E. The first illustrative embodiment of a countershaft 100 may include a first bearing zone 120 and a second bearing zone 130 separated by a spacer 112. The two bearing zones 120, 130 may be integrally formed with one another and/or the spacer 112, or the two bearing zones 120, 130 and/or spacer 112 may be separately formed and later engaged with one another. For brevity, illustrative features of one of the bearing zones 120, 130 will be described in detail, with the understanding that those features may be applied to other bearing zones 120, 130 without limitation. Furthermore, although the embodiment shown in FIGS. 8A-8E includes two discrete bearing zones 120, 130, in other embodiments of the countershaft 100 additional bearing zones 120, 130 and/or spacers 112 may be included without limitation.

The first bearing zone 120 may be configured with a land 116 having a groove 124 and taper 126 formed therein. The land 116 may be on the outside diameter of the countershaft 100 in a manner similar to that previously described above for the illustrative embodiments of a bearing with axial variations 10 shown in FIGS. 5-7. It is contemplated that countershafts 100 configured with features according to the present disclosure may be especially useful in applications wherein the countershaft 100 is stationary (or relatively stationary) and a larger member is positioned adjacent the outside diameter of the countershaft 100, wherein the larger member may rotate with respect to the countershaft 100. However, the specific application of the countershaft 100 and/or configuration with respect to rotating and/or non-rotating members in no way limits the scope of the present disclosure.

Figure 8A:
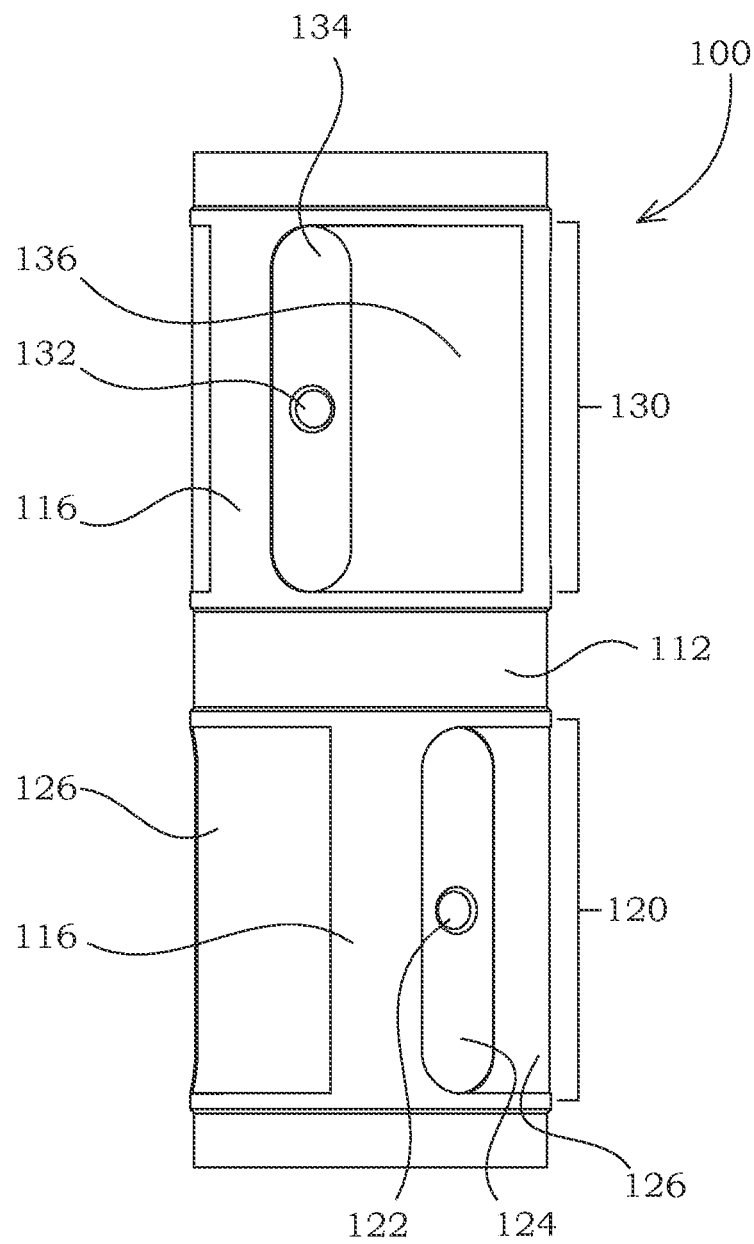
FIG. 8A provides a side view of a first illustrative embodiment of a countershaft.
Figure 8B:
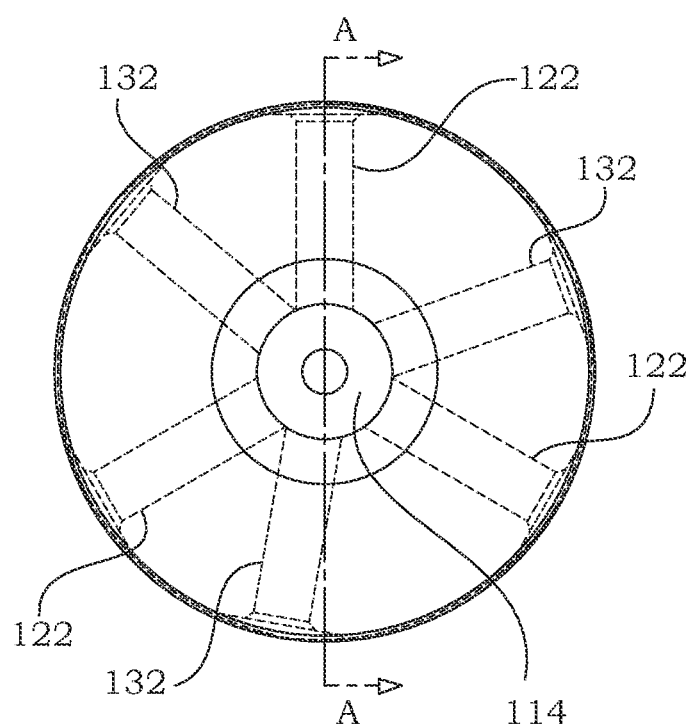
FIG. 8B provides an end view of the embodiment of a shaft with axial variations shown in FIG. 8A.
Figure 8C:
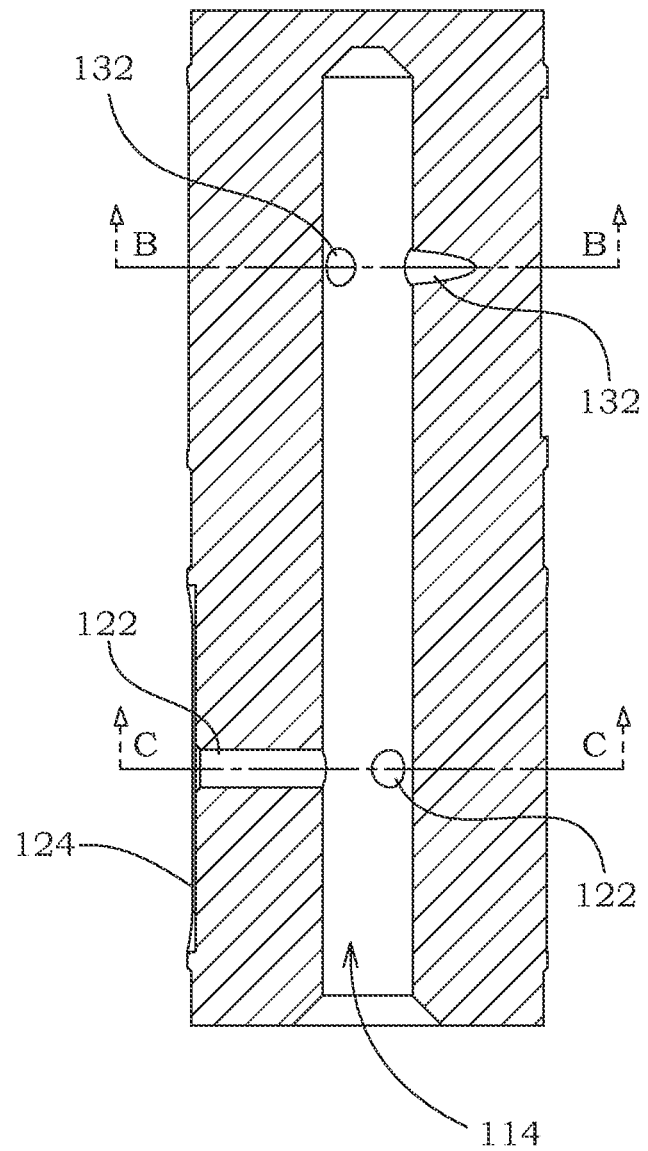
FIG. 8C provides an axial cross-sectional view the embodiment of a shaft with axial variations shown in FIGS. 8A & 8B along line A-A from FIG. 8B.

The embodiment of a countershaft 100 shown in FIGS. 8A-8E may include two bearing zones 120, 130 with at least one groove 124, 134 in each respective bearing zone 120, 130 positioned on the exterior of the countershaft 100. The illustrative embodiment may be configured with an axial channel 114 of a constant or varying profile along the longitudinal length of the countershaft 100, as best shown in FIG. 8C. Additionally, the exterior of the countershaft 100 may have a constant or varying profile along its length. The various features in any groove 124, 134, 144; taper 126, 136, 146; and/or land 116 may be any previously described for any embodiments of a bearing with axial variations 10 without limitation. It is contemplated that lubricant may be supplied to one or more radial holes 122, 132, 142 via a lubricant supply source (not shown), such as a supply of pressurized lubricant. However, the specific method and/or apparatus used to supply lubricant to any radial hole 122, 132, 142 of any embodiment of the countershaft 100 in no way limits the scope of the present disclosure.

Figure 8D:
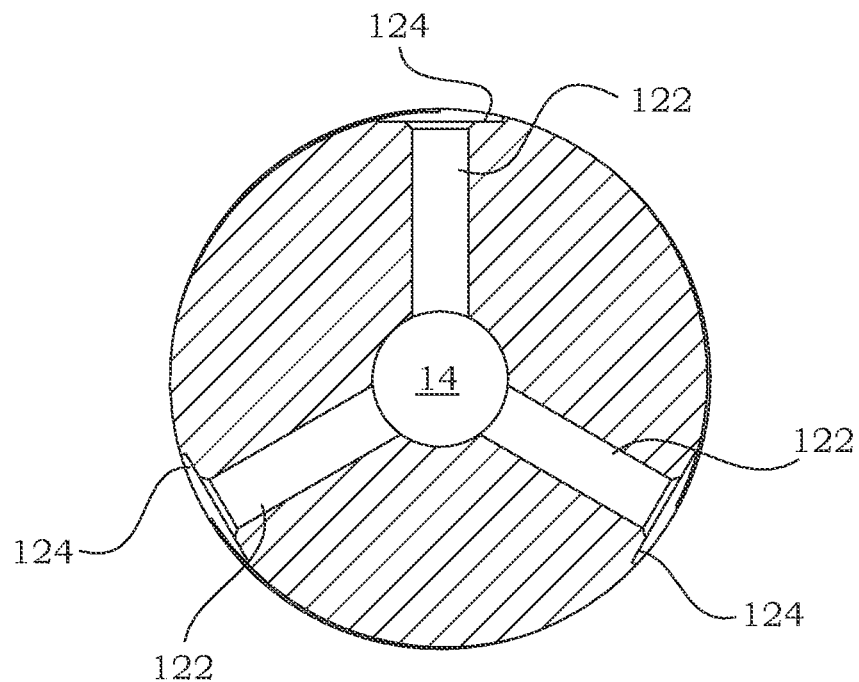
FIG. 8D provides a radial cross-sectional view of the embodiment of a shaft with axial variations shown in FIGS. 8A-8C along the line C-C from FIG. 8C.
Figure 8E:
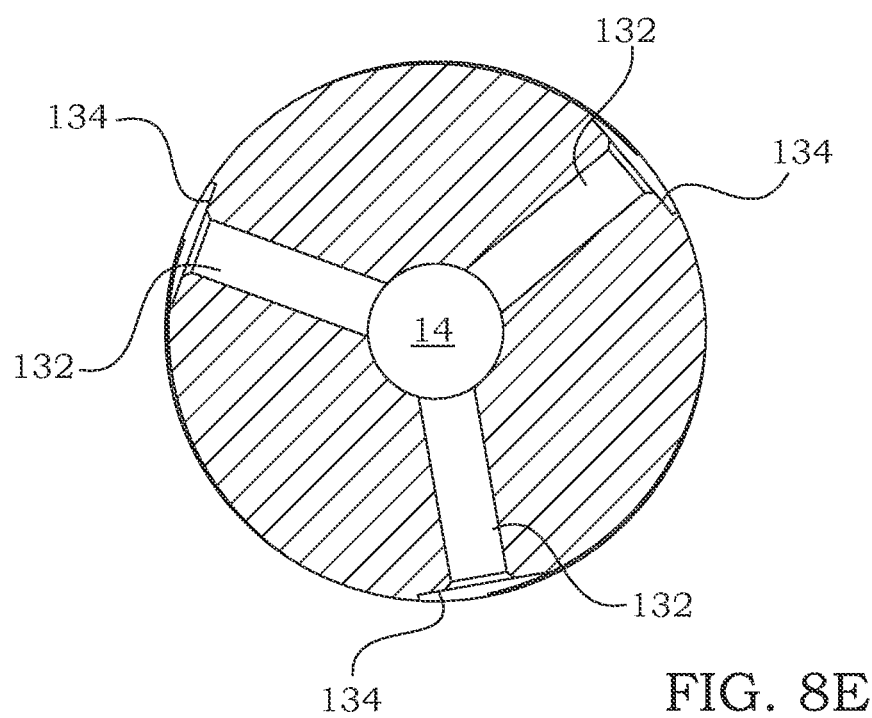
FIG. 8E provides a radial cross-sectional view of the embodiment of a shaft with axial variations shown in FIGS. 8A-8D along the line B-B from FIG. 8C.

One or more radial holes 122, 132 may be configured to be in fluid communication with both the axial channel 114 and any respective grooves 124, 134, within the respective bearing zone 120, 130. An axial, cross-sectional view of the first illustrative embodiment of a countershaft 100 is shown in FIG. 8C, and a radial, cross-sectional view at the first bearing zone 120 is shown in FIG. 8D and at the second bearing zone 130 in FIG. 8E. In the first illustrative embodiment, both the first and second bearing zones 120, 130 may include three radial holes 122, 132 offset from one another by more than 90 degrees but less than 180 degrees. However, other numbers, geometries, and/or overall configurations of the bearing zones 120, 130, radial holes 122, 132, grooves 124, 134 and/or lands 116 may be used without departing from the spirit and scope of the countershaft 100 as disclosed and claimed herein. The radial holes 122 in the first zone 120 may be rotationally offset from those in the second zone 130, as previously described for the various embodiments of the bearing with axial variations 10.

Figure 9A:
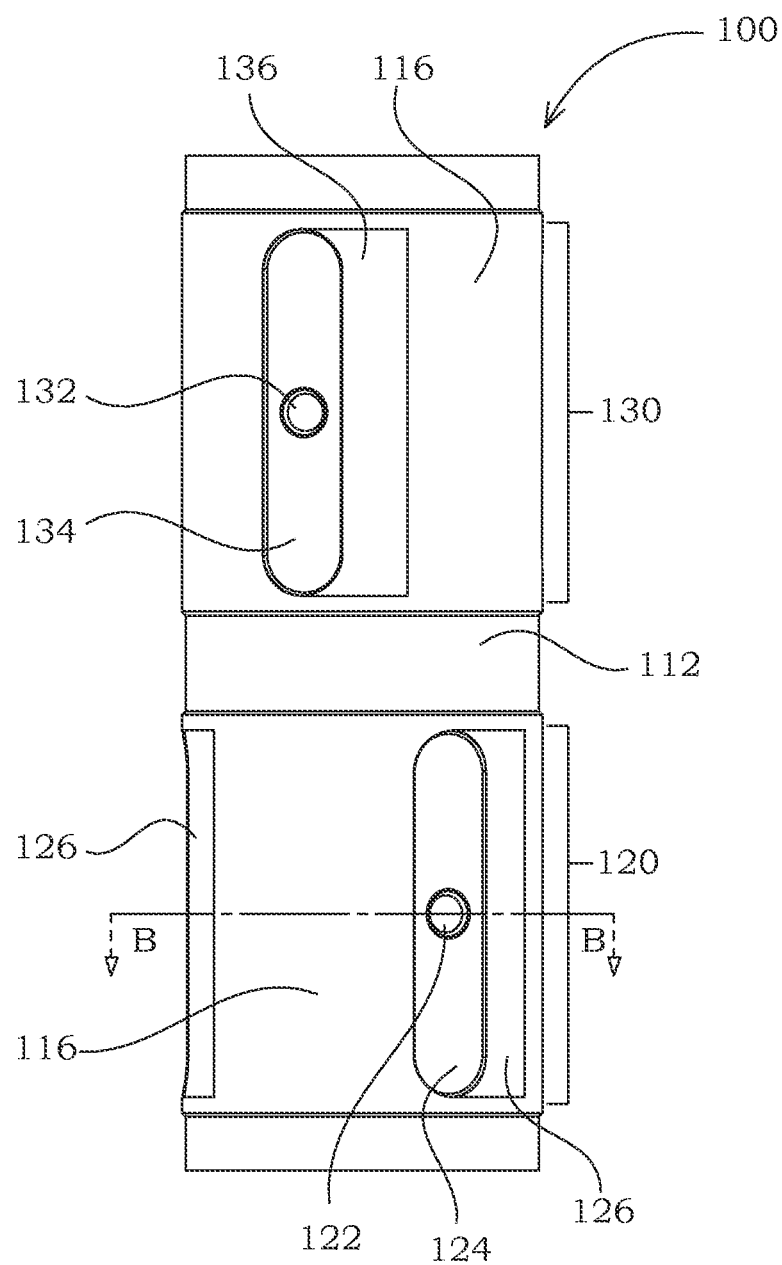
FIG. 9A provides a side view of a second illustrative embodiment of a shaft with axial variations.

A side view of a second embodiment of a countershaft 100 is shown in FIG. 9A. The second embodiment of a countershaft 100 may be formed with one or more radial holes 122, 132 may be configured to be in fluid communication with both an axial channel 114 formed along the longitudinal axis of the countershaft 100 and any respective grooves 124, 134, within the respective bearing zone 120, 130 as previously described for the embodiment pictured in FIGS. 8A-8E. The radial holes 122 in the first bearing zone 120 may be radially offset from the radial holes 132 in the second zone 130 also as previously described for the embodiment pictured in FIGS. 8A-8E. One or more radial holes 122, 132 may be configured to be in fluid communication with both the axial channel 114 and any respective grooves 124, 134, within the respective bearing zone 120, 130.

Figure 9B:
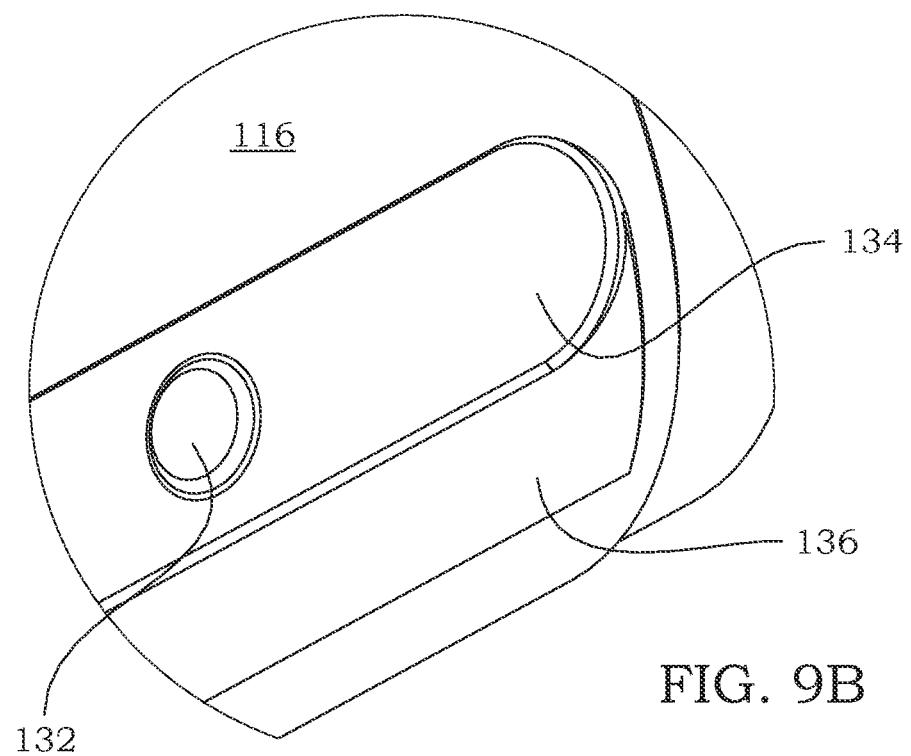
FIG. 9B provides a detailed view of one portion of the embodiment of a shaft with axial variations shown in FIG. 9A.
Figure 9C:
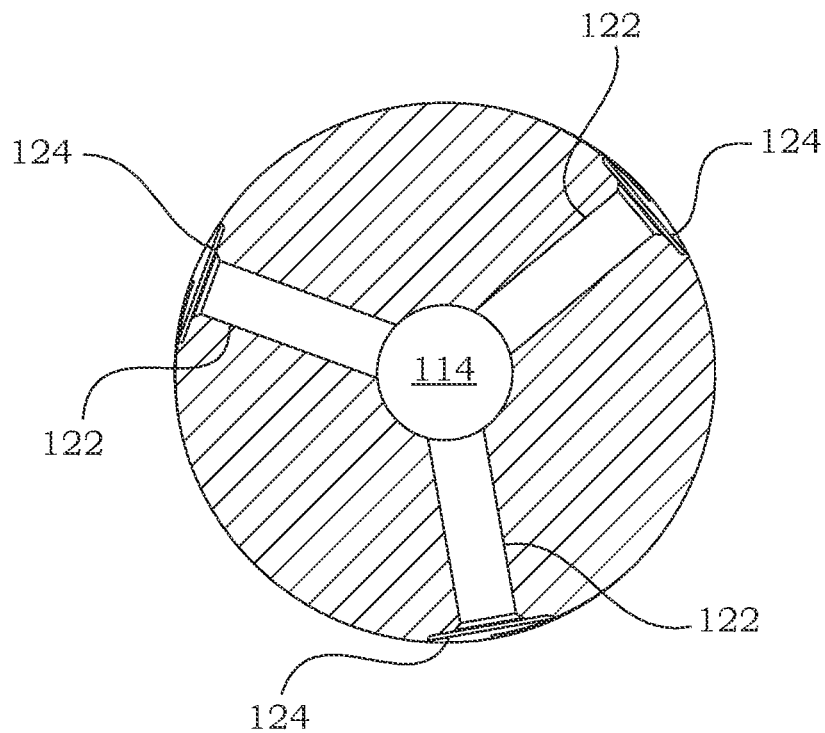
FIG. 9C provides a radial cross-sectional view of the embodiment of a shaft with axial variations shown in FIGS. 9A & 9B along the line B-B from FIG. 9A.

As is evident from a comparison between FIGS. 8A and 9A, the taper 126, 136 for the embodiment shown in FIGS. 9A-9C may be circumferentially shorter than the taper 126, 136 for the embodiment shown in FIGS. 8A-8E. However, as previously described for the various embodiments of a bearing with axial variations 10, the specific number, configuration, and/or characteristics of the grooves 124, 134 are in no way limiting to the scope of the present disclosure. Accordingly, other numbers, geometries, and/or overall configurations of the bearing zones 120, 130, radial holes 122, 132, grooves 124, 134; tapers 126, 136, 146 and/or lands 116 may be used without departing from the spirit and scope of the countershaft 100 as disclosed and claimed herein.

The number, configuration, dimensions, geometries, and/or relative locations of the bearing zones 120, 130; spacers 112; radial holes 122, 132; grooves 124, 134; notches 15, and/or lands 116 will vary from one embodiment of the countershaft 100 to the next, as will the optimal configuration thereof. Accordingly, the countershaft 100 as disclosed and claimed herein is in no way limited by the specific constraints of those elements. In addition to optimizing the rotational offset between bearing zones 120, 130, the number of features (e.g., radial holes 122, 132; grooves 124, 134; grooves, tapers 126, 136, profiles; etc.); and/or lands 116 and the configuration thereof may be optimized for specific operational requirements and/or constraints.

The countershaft 100 as disclosed and claimed herein may extend to any countershaft 100 with a fixed profile, including but not limited to plain cylindrical countershafts, elliptical countershafts, taper land countershafts, pressure dam countershafts, tilting pad countershafts, and offset half countershafts. Furthermore, the present disclosure may be applied to any countershaft or other mechanical elements in which a rotating member is positioned adjacent a non-rotating member.

The optimal number, dimensions, geometries, relative placement, shapes, and/or configuration of the bearing zones 120, 130; radial holes 122, 132; grooves 124, 134; notches 15, and/or lands 116 will vary from one embodiment of the countershaft 100 to the next, and are therefore in no way limiting to the scope thereof. The various elements of an apparatus using at least one feature of the present disclosure may be formed of any material that is suitable for the application for which the apparatus is used. Such materials include but are not limited to metals and their metal alloys, polymeric materials, and/or combinations thereof.

Although the specific embodiments pictured and described herein pertain to countershafts 10 having two bearing zones 120, 130; two or three radial holes 122, 132; and two or three grooves 124, 134 evenly spaced about the circumference of the countershaft 100, the countershaft 100 may be configured with other orientations and/or with different quantities of the various elements having different shapes and/or orientations. Accordingly, the scope of the present disclosure is in no way limited by the specific shape, configuration, and/or dimensions of the above elements, and/or the relative quantities and/or positions thereof.

Having described the preferred embodiments, other features, advantages, and/or efficiencies of the present disclosure will undoubtedly occur to those versed in the art, as will numerous modifications and alterations of the disclosed embodiments and methods, all of which may be achieved without departing from the spirit and scope of the present disclosure as disclosed and claimed herein. Furthermore, variations and modifications of the foregoing are within the scope of the countershaft 100. It is understood that the scope of the countershaft as disclosed herein extends to all alternative combinations of one or more of the individual features mentioned or evident from the text and/or drawings. All of these different combinations constitute various alternative aspects of the countershaft. The embodiments described herein explain the best modes known for practicing the bearing with axial variations and will enable others skilled in the art to utilize the same. The claims are to be construed to include alternative embodiments to the extent permitted by the prior art.

It should be noted that the present disclosure is not limited to the specific embodiments pictured and described herein, but are intended to apply to all similar apparatuses for evenly accommodating different load requirements in a single apparatus. Modifications and alterations from the described embodiments will occur to those skilled in the art without departure from the spirit and scope of the present disclosure.

The invention claimed is:

1. A countershaft comprising:
   a. an axial channel formed along the longitudinal axis of said countershaft;
   b. a first bearing zone formed on an exterior surface of said countershaft, wherein said first bearing zone includes a groove and a taper positioned adjacent one another, and wherein said first bearing zone includes a land positioned adjacent said groove on a side of said groove opposite said taper such that a circumference of said first bearing zone is asymmetric on either side of said groove;
   c. a second bearing zone formed on said exterior surface of said countershaft, wherein said second bearing zone includes a groove and a taper positioned adjacent one another, wherein said second bearing zone includes a land positioned adjacent said groove on a side of said groove opposite said taper such that a circumference of said second bearing zone is asymmetric on either side of said groove, and wherein said groove in said first zone and said groove in said second zone are rotationally offset from one another;
   d. a first radial hole formed in said countershaft, wherein said first radial hole fluidly connects said axial channel to said groove in said first bearing zone; and,
   e. a second radial hole formed in said countershaft, wherein said second radial hole fluidly connects said axial channel to said groove in said second bearing zone.

2. The countershaft according to claim 1 wherein said groove in said first bearing zone further comprises a notch.

3. The countershaft according to claim 2 wherein said groove in said second bearing zone further comprises a notch.

4. The countershaft according to claim 1 wherein said countershaft further comprises a second groove in said first bearing zone and a third radial hole fluidly connecting said axial channel to said second groove in said first bearing zone.

5. The countershaft according to claim 4 wherein said countershaft further comprises a taper positioned adjacent said second groove in said first bearing zone.

6. The countershaft according to claim 4 wherein said countershaft further comprises a second groove in said second bearing zone and a fourth radial hole fluidly connecting said axial channel to said second groove in said second bearing zone.

7. The countershaft according to claim 6 wherein said countershaft further comprises a taper positioned adjacent said second groove in said second bearing zone.

8. The countershaft according to claim 7 wherein said land in said first bearing zone is further defined as having no profile formed therein.

9. The countershaft according to claim 8 wherein said land in said second bearing zone is further defined as having no profile formed therein.

10. A countershaft comprising:
   a. an axial channel formed along the longitudinal axis of said countershaft;
   b. a first bearing zone formed on an exterior surface of said countershaft, wherein said first bearing zone includes a groove, a taper positioned adjacent said groove on a first side of said groove, and a land positioned adjacent said groove on a second side of said groove such that a circumference of said first bearing zone is asymmetric with respect to said first and second sides said groove, and wherein a radial dimension of said countershaft varies along the circumference thereof between said groove and an interface between said taper and said land;
   c. a second bearing zone formed on said exterior surface of said countershaft, wherein said second bearing zone includes a groove, a taper positioned adjacent said groove on a first side of said groove, and a land positioned adjacent said groove on a second side of said groove such that a circumference of said second bearing zone is asymmetric with respect to said first and second sides of said groove, wherein a radial dimension of said countershaft varies along the circumference thereof between said groove and an interface between said taper and said land, and wherein said groove in said first zone and said groove in said second zone are rotationally offset from one another;
   d. a first radial hole formed in said countershaft, wherein said first radial hole fluidly connects said axial channel to said groove in said first bearing zone; and,
   e. a second radial hole formed in said countershaft, wherein said second radial hole fluidly connects said axial channel to said groove in said second bearing zone.

11. The countershaft according to claim 10 further comprising:
   a. a second groove and a second taper positioned in said first bearing zone; and,
   b. a third radial hole formed in said countershaft, wherein said third radial hole fluidly connects said axial channel to said second groove in said first bearing zone.

12. The countershaft according to claim 11 further comprising:
   a. a second groove and a second taper positioned in said second bearing zone; and,
   b. a fourth radial hole formed in said countershaft, wherein said fourth radial hole fluidly connects said axial channel to said second groove in said second bearing zone.

13. The countershaft according to claim 12 wherein said first and second grooves in said first bearing zone are further defined as being rotationally offset from one another by 180 degrees.

14. The countershaft according to claim 13 wherein said first and second grooves in said second bearing zone are further defined as being rotationally offset from one another by 180 degrees.

15. The countershaft according to claim 14 wherein said first groove in said first bearing zone and said first groove in said second bearing zone are further defined as being rotationally offset from one another by an amount between 5 and 179 degrees.

16. A method of accommodating a plurality of forces experienced by a countershaft, said method comprising the steps of:
   a. forming a first bearing zone on an exterior surface of said countershaft, wherein said first bearing zone includes a groove and a taper positioned adjacent one another, wherein said taper is positioned adjacent a first side of said groove, and wherein a land is positioned adjacent a second side of said groove such that said first bearing zone is asymmetric with respect to said first and second sides of said groove;
   b. forming a second bearing zone on an exterior surface of said countershaft, wherein said second bearing zone includes a groove and a taper positioned adjacent one another, wherein said taper is positioned adjacent a first side of said groove, wherein a land is positioned adjacent a second side of said grove such that said second bearing zone is asymmetric with respect to said first and second sides of said groove, and wherein said groove in said first zone and said groove in said second zone are rotationally offset from one another;
   c. supplying a pressurized fluid to an axial channel formed along the longitudinal axis of said countershaft;
   d. allowing said pressurized fluid to migrate to said groove in said first bearing zone via a radial hole fluidly connecting said axial channel and said groove in said first bearing zone;
   e. allowing said pressurized fluid to migrate to said groove in said second bearing zone via a second radial hole fluidly connecting said axial channel and said groove in said second bearing zone;
   f. configuring a profile in said groove and said taper of said first zone to accommodate a first force experienced by said countershaft; and,
   g. configuring a profile in said groove and said taper of said second zone to accommodate a second force experienced by said countershaft, wherein said first and second forces are not equal in either a direction or a magnitude.

* * * * *